(12) United States Patent
Nakagawa

(10) Patent No.: US 12,366,966 B2
(45) Date of Patent: Jul. 22, 2025

(54) MEMORY SYSTEM

(71) Applicant: Kioxia Corporation, Tokyo (JP)

(72) Inventor: Takashi Nakagawa, Chofu Tokyo (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/440,804

(22) Filed: Feb. 13, 2024

(65) Prior Publication Data

US 2024/0272799 A1 Aug. 15, 2024

(30) Foreign Application Priority Data

Feb. 14, 2023 (JP) ................................ 2023-021015

(51) Int. Cl.
*G06F 3/06* (2006.01)
(52) U.S. Cl.
CPC .......... *G06F 3/0613* (2013.01); *G06F 3/0659* (2013.01); *G06F 3/0679* (2013.01)
(58) Field of Classification Search
None
See application file for complete search history.

(56) References Cited

U.S. PATENT DOCUMENTS

| 9,190,159 | B2 | 11/2015 | Kurosawa |
| 9,595,320 | B2 | 3/2017 | Wu et al. |
| 10,777,283 | B2 | 9/2020 | Asami et al. |
| 11,195,585 | B2 | 12/2021 | Tokutomi et al. |
| 2020/0211654 | A1 * | 7/2020 | Asami ................ G11C 29/52 |

FOREIGN PATENT DOCUMENTS

| JP | 2018055748 | A | * | 4/2018 | ......... G11C 11/5642 |
| JP | 2020047318 | A | | 3/2020 | |
| JP | 2020107376 | A | | 7/2020 | |

* cited by examiner

*Primary Examiner* — Brian R Peugh
(74) *Attorney, Agent, or Firm* — Kim & Stewart LLP

(57) ABSTRACT

A memory system includes a nonvolatile memory and a memory controller. The memory controller is configured to: execute a first tracking process to determine a value of a first voltage in a patrol process that is carried out independently of a request from a host, execute a first data read process to read first data from the nonvolatile memory in response to receiving a read request from the host, cause the nonvolatile memory to execute a second tracking process using the first voltage when error correction of the first data fails, receive a value of a second voltage from the nonvolatile memory as a result of the second tracking process, and execute a second data read process using the second voltage to read second data from the nonvolatile memory.

20 Claims, 18 Drawing Sheets

FIG. 5
| BLK | R1 | R2 | ... | R7 |
|---|---|---|---|---|
| 0 | ΔR1_0 | ΔR2_0 | ... | ΔR7_0 |
| 1 | ΔR1_1 | ΔR2_1 | ... | ΔR7_1 |
| 2 | ΔR1_2 | ΔR2_2 | ... | ΔR7_2 |
| 3 | ΔR1_3 | ΔR2_3 | ... | ΔR7_3 |
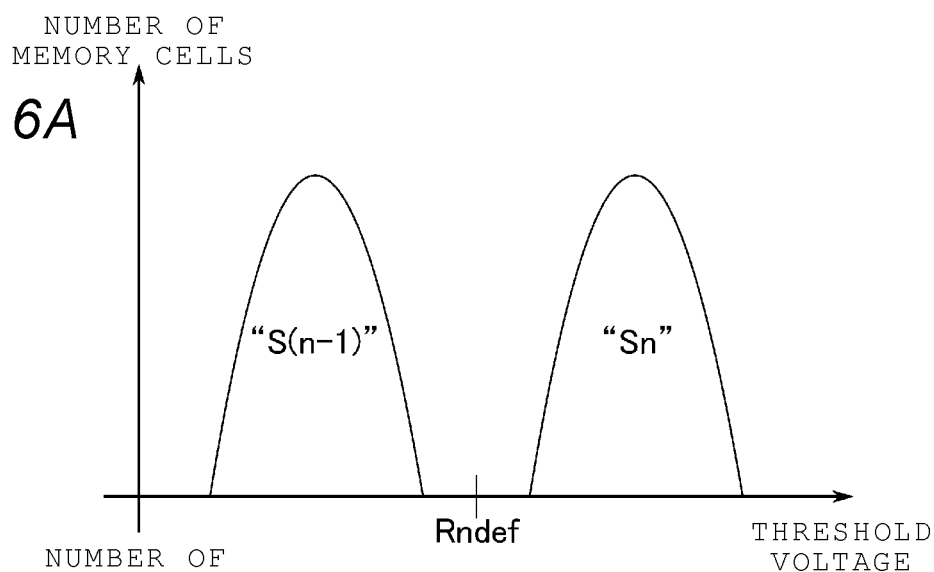
FIG. 6A
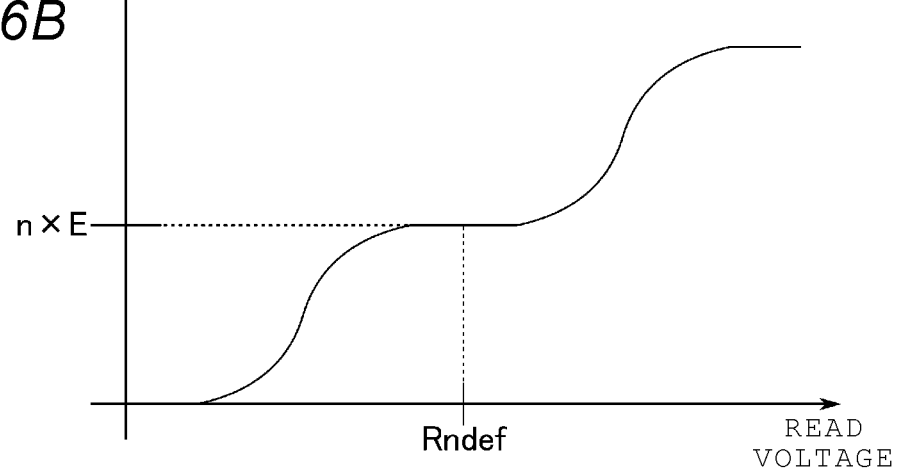
FIG. 6B

| DIFFERENCE IN NUMBER OF ON-CELLS | AMOUNT OF CHANGE IN READ VOLTAGE |
|---|---|
| ΔC1 | ΔVR1 |
| ΔC2 | ΔVR2 |
| ΔC3 | ΔVR3 |
| ⋮ | ⋮ |

MEMORY SYSTEM

CROSS-REFERENCE TO RELATED APPLICATION(S)

This application is based upon and claims the benefit of priority from Japanese Patent Application No. 2023-021015, filed Feb. 14, 2023, the entire contents of which are incorporated herein by reference.

FIELD

Embodiments described herein relate generally to a memory system.

BACKGROUND

A memory system including a nonvolatile memory such as a NAND flash memory and a memory controller that controls the nonvolatile memory is known.

DESCRIPTION OF THE DRAWINGS

FIG. 5 is a diagram illustrating a configuration of shift amount information used in a memory system according to the first embodiment.

FIGS. 6A and 6B are schematic diagrams illustrating another example of threshold voltage distributions of the plurality of memory cell transistors, and another example of cumulative distribution function, according to the first embodiment.

DETAILED DESCRIPTION

Figure 1:
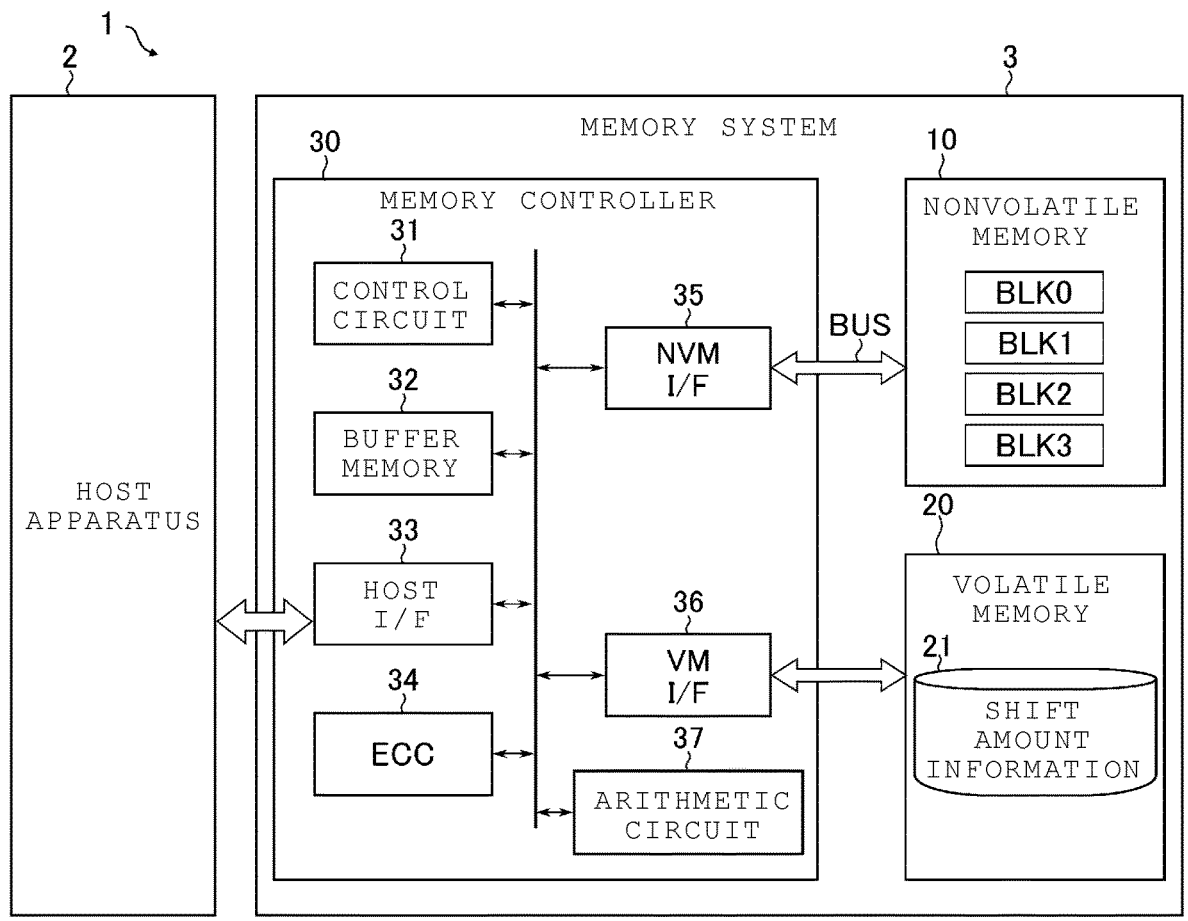
FIG. 1 is a block diagram illustrating a configuration of an information processing system according to a first embodiment.

Embodiments provide a memory system where an operating speed is improved.

In general, according to one embodiment, a memory system includes a nonvolatile memory including a plurality of memory cells, and a memory controller configured to execute a data read process of reading data from the plurality of memory cells. Further, the memory controller is configured to execute a first tracking process to determine a value of a first voltage in a patrol process that is carried out independently of a request from a host. Further, the memory controller is configured to execute a first data read process to read first data from the nonvolatile memory in response to receiving a read request from the host and to cause the nonvolatile memory to execute a second tracking process using the first voltage when error correction of the first data fails. Further, the memory controller is configured to receive a value of a second voltage from the nonvolatile memory as a result of the second tracking process and to execute a second data read process using the second voltage to read second data from the nonvolatile memory.

Hereinafter, embodiments will be described with reference to the drawings. In the following description, components having substantially the same function and configuration will be denoted by the same reference numerals. In addition, the following embodiments show an example of technical ideas. The embodiments do not limit materials, shapes, structures, arrangement, and the like of components that may be used. Various changes can be made for other embodiments.

<1> First Embodiment

<1-1> Configuration
<1-1-1> Information Processing System

A configuration of an information processing system according to a first embodiment will be described. FIG. 1 is a block diagram illustrating a configuration of the information processing system according to the first embodiment. As illustrated in FIG. 1, the information processing system 1 includes a host apparatus 2 and a memory system 3.

The host apparatus 2 is a data processing apparatus that processes data using the memory system 3. The host apparatus 2 is, for example, a personal computer or a server in a data center.

The memory system 3 is a storage device configured to be connected to the host apparatus 2. The memory system 3 is, for example, a memory card such as an SD® card, a universal flash storage (UFS) device, or a solid state drive (SSD).

<1-1-2> Memory System

An internal configuration of the memory system according to the first embodiment will be described. The memory system 3 includes a nonvolatile memory 10, a volatile memory 20, and a memory controller 30.

The nonvolatile memory 10 is, for example, a NAND flash memory. The nonvolatile memory 10 includes a plurality of blocks BLK (BLK0 to BLK3). Each of the blocks BLK includes a plurality of memory cell transistors (hereinafter, also simply referred to as memory cells) each of which stores data in a nonvolatile manner. Each of the blocks BLK is, for example, a unit of a data erase process.

The volatile memory 20 is, for example, a dynamic random access memory (DRAM). The volatile memory 20 stores shift amount information 21. The details of the shift amount information 21 will be described below.

The memory controller 30 is configured with an integrated circuit such as a system-on-a-chip (SoC). The memory controller 30 controls the nonvolatile memory 10 based on a request from the host apparatus 2 or irrespective of a request from the host apparatus 2.

Specifically, for example, the memory controller 30 reads data from the nonvolatile memory 10 based on a read request from the host apparatus 2. The memory controller 30 transmits the read data to the host apparatus 2. In addition, for example, the memory controller 30 reads data from the nonvolatile memory 10 as an internal process. The memory controller 30 controls the nonvolatile memory 10 based on the read data.

<1-1-3> Memory Controller

Next, an internal configuration of the memory controller 30 will be described with reference to FIG. 1. The memory controller 30 includes a control circuit 31, a buffer memory 32, a host interface circuit (host I/F) 33, an error correction and check (ECC) circuit 34, a nonvolatile memory interface circuit (NVM I/F) 35, a volatile memory interface circuit (VM I/F) 36, and an arithmetic circuit 37. The function of each of the units 31 to 37 of the memory controller 30 described below may be implemented by any of dedicated hardware, a processor that executes firmware, or a combination thereof.

The control circuit 31 is a circuit that controls the entire memory controller 30. The control circuit 31 includes, for example, a processor such as a central processing unit (CPU), and a read only memory (ROM).

The buffer memory 32 is, for example, a static random access memory (SRAM). The buffer memory 32 buffers data between the host apparatus 2 and the nonvolatile memory 10. The buffer memory 32 temporarily stores write data and read data.

The host interface circuit 33 controls communication between the memory controller 30 and the host apparatus 2. The host interface circuit 33 is connected to the host apparatus 2 via a host bus. The host bus is based on, for example, an SD® interface, an M-PHY, a serial attached small computer system interface (SAS), a serial advanced technology attachment (SATA), or a peripheral component interconnect express (PCIe®).

The ECC circuit 34 executes an error detection process and an error correction process regarding data stored in the nonvolatile memory 10. That is, during a data write process, the ECC circuit 34 adds an error correction code to write data. During a data read process, the ECC circuit 34 decodes read data and detects whether a fail bit is included. The fail bit is a bit in data read from a plurality of memory cells that is different from data written therein. When the fail bit is detected, the ECC circuit 34 specifies a column address of the fail bit and executes error correction. Examples of a method of the error correction include hard decision decoding (also referred to as hard bit decoding) and soft decision decoding (also referred to as soft bit decoding). As a hard decision decoding code used for the hard decision decoding, for example, a Bose-Chaudhuri-Hocquenghem (BCH) code or a Reed-Solomon (RS) code may be used. As a soft decision decoding code used for the soft decision decoding, for example, a low density parity check (LDPC) code may be used.

The nonvolatile memory interface circuit 35 controls communication between the nonvolatile memory 10 and the memory controller 30. The nonvolatile memory interface circuit 35 is connected to the nonvolatile memory 10 via a memory bus BUS. The memory bus BUS is based on, for example, a single data rate (SDR) interface, a toggle double data rate (DDR) interface, or an open NAND flash interface (ONFI).

The volatile memory interface circuit 36 controls communication between the volatile memory 20 and the memory controller 30. A bus that connects the volatile memory 20 and the memory controller 30 is based on, for example, a DRAM interface specification.

The arithmetic circuit 37 is, for example, a counter. The arithmetic circuit 37 counts the number of memory cells that store the same value, based on read data stored in the buffer memory 32.

<1-1-4> Memory Bus

Figure 2:
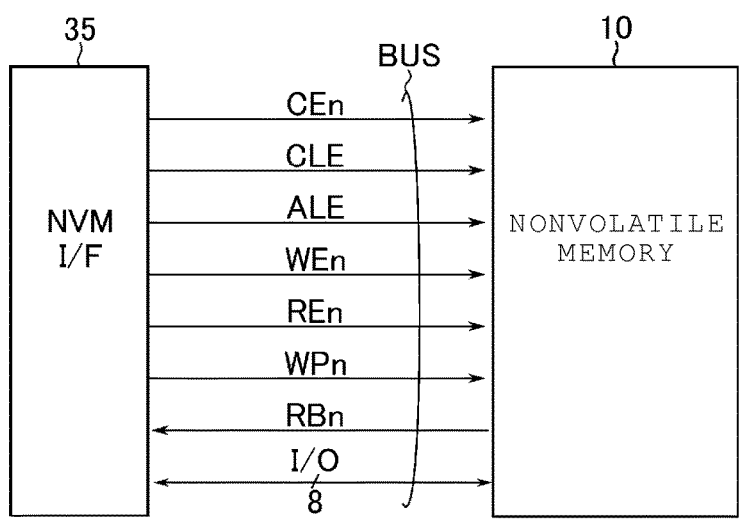
FIG. 2 is a block diagram illustrating an example of a signal used in a memory bus according to the first embodiment.

Next, an example of a signal that is exchanged between the nonvolatile memory 10 and the memory controller 30 will be described. FIG. 2 is a block diagram illustrating an example of signals that are used in the memory bus according to the first embodiment.

The signals used in the memory bus BUS include, for example, a chip enable signal CEn, a command latch enable signal CLE, an address latch enable signal ALE, a write enable signal WEn, a read enable signal REn, a write-protect signal WPn, a ready/busy signal RBn, and an input/output signal I/O. In the present specification, "n" at the end of a name of a signal represents that the signal is asserted when the level thereof is "low (L)".

The chip enable signal CEn is a signal for enabling the nonvolatile memory 10.

The command latch enable signal CLE and the address latch enable signal ALE are signals for notifying the nonvolatile memory 10 that signals I/O to the nonvolatile memory 10 are a command and an address, respectively.

The write enable signal WEn is a signal for inputting the signal I/O into the nonvolatile memory 10.

The read enable signal REn is a signal for reading the signal I/O from the nonvolatile memory 10.

The write-protect signal WPn is a signal for instructing the nonvolatile memory 10 to prevent data writing and erasing.

The ready/busy signal RBn is a signal representing whether the nonvolatile memory 10 is in a ready state or a busy state. The ready state is a state where the nonvolatile memory 10 can receive a command from the memory controller 30. The busy state is a state where the nonvolatile memory 10 cannot receive a command from the memory controller 30. The ready/busy signal RBn represents the busy state at the "L" level.

The input/output signal I/O is, for example, an 8-bit signal. The input/output signal I/O contains data that is transmitted and received between the nonvolatile memory 10 and the memory controller 30. The input/output signal I/O includes a command, an address, a status, write data, and read data.

<1-1-5> Nonvolatile Memory

Figure 3:
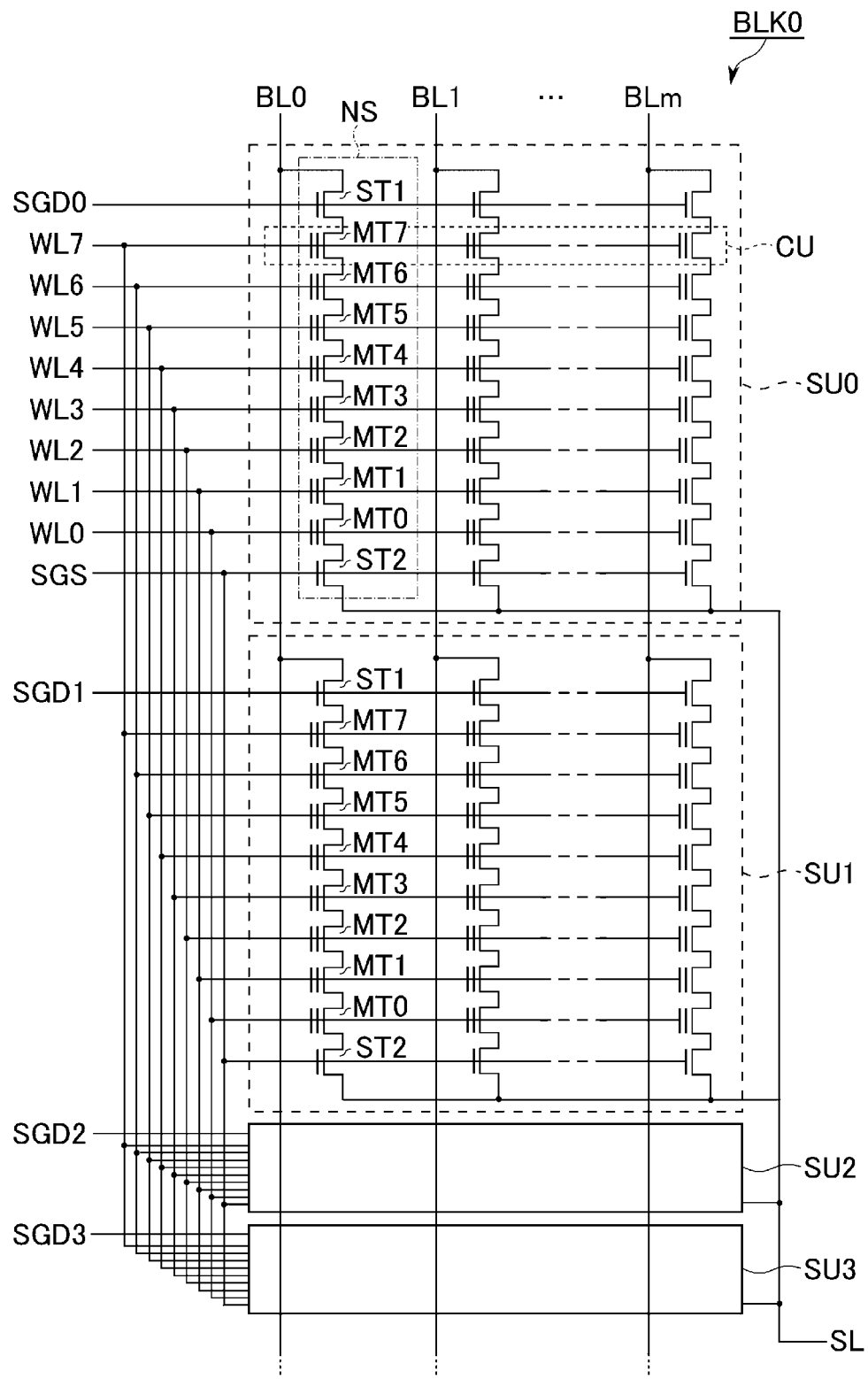
FIG. 3 is a circuit diagram illustrating an example of a configuration of a nonvolatile memory according to the first embodiment.

Next, an internal configuration of the nonvolatile memory 10 will be described. FIG. 3 is a circuit diagram illustrating an example of a configuration of the nonvolatile memory according to the first embodiment. FIG. 3 illustrates a configuration of the block BLK0 as an example. Configurations of the other blocks BLK1 to BLK3 are the same as the configuration of the block BLK0. The block BLK0 includes, for example, four string units SU0 to SU3. In FIG. 3, the detailed configurations of the string units SU2 and SU3 are omitted.

Each of the string units SU includes a plurality of NAND strings NS that are associated with bit lines BL0 to BLm (m represents an integer of 1 or larger), respectively. The NAND string NS include memory cell transistors MT0 to MT7 and select transistors ST1 and ST2.

The memory cell transistor MT includes a control gate and a charge storage layer and stores data in a nonvolatile manner. Each of the select transistors ST1 and ST2 is used for selection of the string unit SU in various processes.

In each of the NAND strings NS, the memory cell transistors MT0 to MT7 are connected in series to each other. The select transistor ST1 is connected between the associated bit line BL and one end of the memory cell transistors MT0 to MT7 that are connected in series. The drain of the select transistor ST2 is connected to the other end of the memory cell transistors MT0 to MT7 that are connected in series. A source line SL is connected to the source of the select transistor ST2.

In the same block BLK, the gates of the plurality of select transistors ST1 in each of the string units SU0 to SU3 are connected in common to each of select gate lines SGD0 to SGD3. The control gates of the plurality of memory cell transistors MT0 to MT7 are connected in common to word lines WL0 to WL7, respectively. The gates of the plurality of select transistors ST2 are connected in common to a select gate line SGS.

The bit lines BL0 to BLm are shared by the plurality of blocks BLK0 to BLK3. The same bit line BL is connected to the NAND string NS corresponding to the same column address. The word lines WL0 to WL7 are provided in each of the blocks BLK0 to BLK3. The source line SL is shared by, for example, the plurality of blocks BLK0 to BLK3.

A group of a plurality of memory cell transistors MT that are connected to the common word line WL in one string unit SU will be referred to as, for example, "cell unit CU", and is used as a unit of a data write process. For example, a storage capacity of the cell unit CU including the memory cell transistors MT each of which stores 1-bit data is defined as a page. The page is used as, for example, a unit of a data read process. In addition, data having a size corresponding to one page is defined as page data. That is, one page data is data having the same number of bits as the number of memory cell transistors MT in the cell unit CU. The cell unit CU may include a storage capacity of two or more pages according to the number of bits stored in the memory cell transistor MT.

The circuit configuration of the block BLK described above is merely exemplary, and the embodiment is not limited thereto. For example, the number of blocks BLK in the nonvolatile memory 10 may be any number according to the design. The number of the string units SU provided in each block BLK may be any number according to the design. The numbers of the memory cell transistors MT and the select transistors ST1 and ST2 in each of the NAND strings NS may be any numbers, respectively, according to the design.

In the embodiment, one memory cell transistor MT can store 3-bit data. That is, the memory cell transistor MT according to the embodiment is a triple level cell (TLC) that stores 3-bit data. Bits of the 3-bit data that is stored in the memory cell transistor MT configured as the TLC will be referred to as a lower bit, a middle bit, and an upper bit in order from the lowest bit. In addition, a group of the lower bits stored in the memory cell transistors MT in the same cell unit CU will be referred to as "lower page data, a group of the middle bits will be referred as "middle page data", and a group of the upper bits will be referred as "upper page data".

Figure 4:
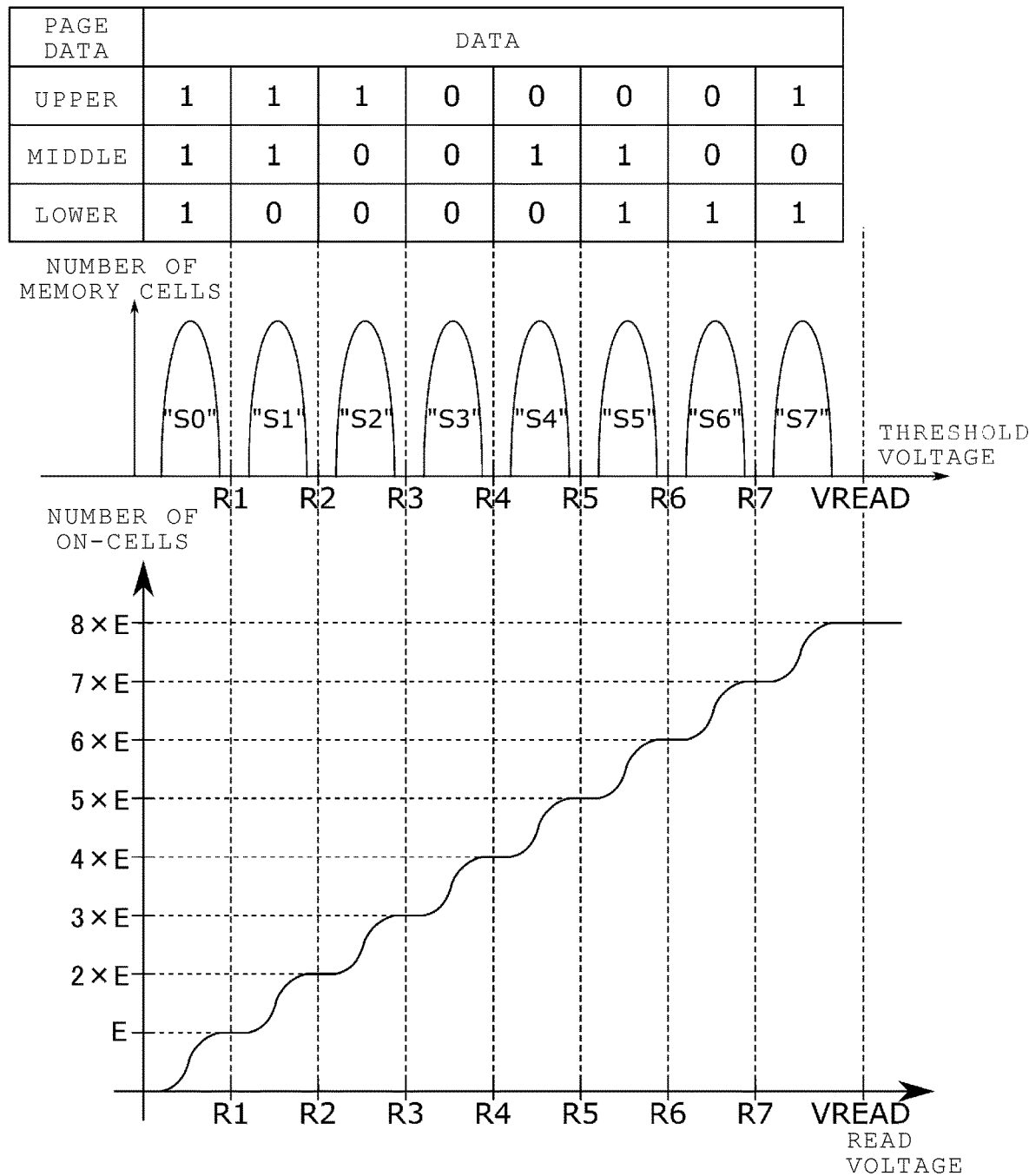
FIG. 4 is a schematic diagram illustrating an example of threshold voltage distributions of a plurality of memory cell transistors, and an example of a cumulative distribution function, according to the first embodiment.

FIG. 4 is a schematic diagram illustrating an example of threshold voltage distributions of the plurality of memory cell transistors MT, and an example of a cumulative distribution function, according to the first embodiment. The upper portion of FIG. 4 illustrates the threshold voltage distribution, and the lower portion of FIG. 4 illustrates the cumulative distribution function. When the memory cell transistor MT stores 3-bit data, the threshold voltage distribution is divided into eight sections. The eight threshold voltage distributions will be referred to as an "S0" state, an "S1" state, an "S2" state, an "S3" state, an "S4" state, an "S5" state, an "S6" state, and an "S7" state in order from the lowest threshold voltage.

In addition, each of voltages R1, R2, R3, R4, R5, R6, and R7 illustrated in FIG. 4 is used for distinguishing between two adjacent states during a data read process. A voltage VREAD is a voltage that is applied to a non-selected word line during the data read process. When the voltage VREAD is applied to the gate, the memory cell transistor MT enters an ON state irrespective of data stored therein. A relationship between the voltage values is R1<R2<R3<R4<R5<R6<R7<VREAD.

Among the threshold voltage distributions described above, the "S0" state corresponds to an erased state of the memory cell transistor MT. Threshold voltages in the "S0" state are lower than the voltage R1. Threshold voltages in the "S1" state are the voltage R1 or higher and lower than the voltage R2. Threshold voltages in the "S2" state are the voltage R2 or higher and lower than the voltage R3. Threshold voltages in the "S3" state are the voltage R3 or higher and lower than the voltage R4. Threshold voltages in the "S4" state are the voltage R4 or higher and lower than the voltage R5. Threshold voltages in the "S5" state are the voltage R5 or higher and lower than the voltage R6. Threshold voltages in the "S6" state are the voltage R6 or higher and lower than the voltage R7. Threshold voltages in the "S7" state are the voltage R7 or higher and lower than the voltage VREAD.

The eight threshold voltage distributions are formed by writing 3-bit data including the lower bit, the middle bit, and the upper bit into each of the memory cell transistors MT. The eight threshold voltage distributions correspond to different pieces of 3-bit data. In the embodiment, data is assigned as "the upper bit/the middle bit/the lower bit" for a memory cell transistor MT in each of the states as described below.

That is, the memory cell transistor MT in the "S0" state stores "111" data. The memory cell transistor MT in the "S1" state stores "110" data. The memory cell transistor MT in the "S2" state stores "100" data. The memory cell transistor MT in the "S3" state stores "000" data. The memory cell transistor MT in the "S4" state stores "010" data. The memory cell transistor MT in the "S5" state stores "011" data. The memory cell transistor MT in the "S6" state stores "001" data. The memory cell transistor MT in the "S7" state stores "101" data.

A lower page read process is a data read process in which the voltage R1 for distinguishing between the "S0" state and the "S1" state, and the voltage R5 for distinguishing between the "S4" state and the "S5" state are used as the read voltages.

A middle page read process is a data read process in which the voltage R2 for distinguishing between the "S1" state and the "S2" state, the voltage R4 for distinguishing between the "S3" state and the "S4" state, and the voltage R6 for distinguishing between the "S5" state and the "S6" state are used as the read voltages.

An upper page read process is a data read process in which the voltage R3 for distinguishing between the "S2" state and the "S3" state, and the voltage R7 for distinguishing between the "S6" state and the "S7" state are used as the read voltages.

Data stored in the cell unit CU is randomized such that the states including the "S0" state to the "S7" state are uniformly present.

The cumulative distribution function illustrated in the lower portion of FIG. 4 represents the number of memory cell transistors MT that are in an ON state when data is read using read voltages. The horizontal axis represents the read voltage, and the vertical axis represents the total number of memory cell transistors MT in the ON state (hereinafter, referred to as the number of ON-cells). It is assumed that an expected value of the number of memory cell transistors MT in each of the states is E. In this case, it is expected that, whenever the read voltage increases by an amount corresponding to the voltage for distinguishing between two states, the number of ON-cells increases by E.

Specifically, when the read voltage is the voltage R1, the expected value of the number of ON-cells is E. When the read voltage is increased up to the voltage R2, the expected value of the number of ON-cells is 2×E. When the read voltage is increased up to the voltage R3, the expected value of the number of ON-cells is 3×E. When the read voltage is increased up to the voltage R4, the expected value of the number of ON-cells is 4×E. When the read voltage is increased up to the voltage R5, the expected value of the number of ON-cells is 5×E. When the read voltage is increased up to the voltage R6, the expected value of the number of ON-cells is 6×E. When the read voltage is increased up to the voltage R7, the expected value of the number of ON-cells is 7×E. When the read voltage is increased up to the voltage VREAD, the expected value of the number of ON-cells is 8×E.

<1-1-6> Shift Amount Information

Next, a configuration of the shift amount information 21 will be described. FIG. 5 is a diagram illustrating a configuration of the shift amount information used in the memory system according to the first embodiment. As illustrated in FIG. 5, the shift amount information 21 stores each of shift amounts ($\Delta R1\_i$ to $\Delta R7\_i$) of each of the read voltages R1 to R7 from a default value in association with a block BLKi.

The shift amount information 21 is used in an operation relating to the read voltage. For example, in a data read process, the memory controller 30 sets the read voltage based on the shift amount information 21. For example, in a patrol process, the memory controller 30 determines a starting point of a shift amount search based on the shift amount information 21. The details of the patrol process will be described below.

<1-2> Operation

Next, an operation of the memory system according to the first embodiment will be described.

<1-2-1> Shift Read Process and Tracking Process

First, a shift read process and a tracking process that are executed in the memory system 3 according to the first embodiment will be described. The shift read process and the tracking process are executed, for example, when it is assumed that a larger number of fail bits are detected at a default read voltage.

Figure 7A:
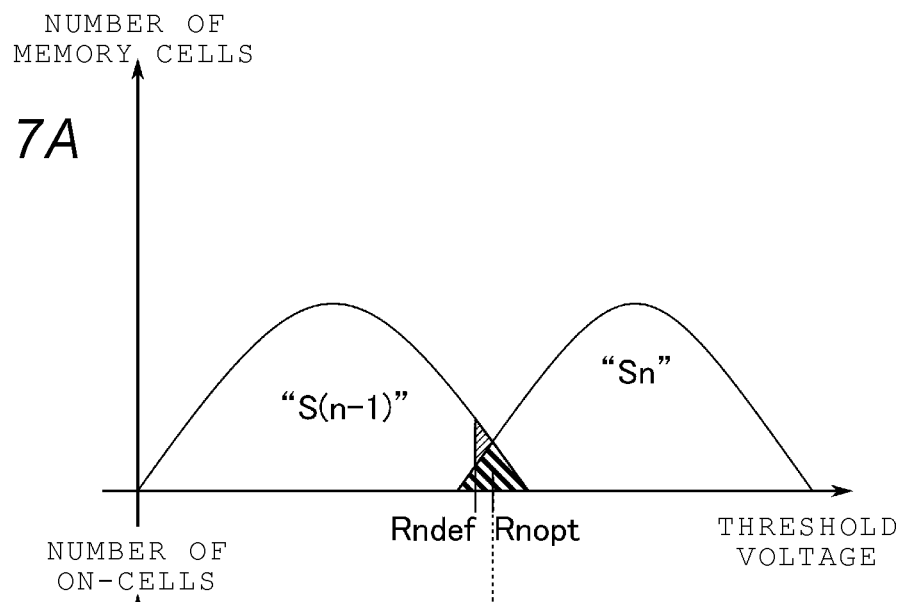
FIGS. 7A and 7B are schematic diagrams illustrating still another example of threshold voltage distributions of the plurality of memory cell transistors, and still another example of cumulative distribution function, according to the first embodiment.
Figure 7B:
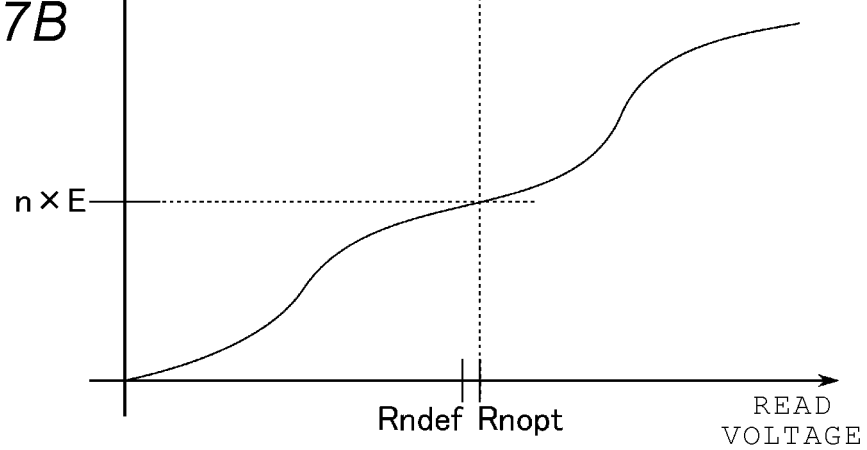

FIGS. 6 and 7 are schematic diagrams illustrating examples of the threshold voltage distributions of the plurality of memory cell transistors, and examples of the cumulative distribution function, according to the first embodiment. FIGS. 6A and 6B illustrate a state immediately after a data write process. FIGS. 7A and 7B illustrate a state where the adjacent threshold voltage distributions overlap each other.

As illustrated in FIG. 6A, for example, immediately after the data write process, threshold voltage distributions of an "S(n−1)" state (n represents an integer of 1 or larger and 7 or smaller) and an "Sn" state are separated from each other. Accordingly, the memory controller 30 can read correct data by setting the read voltage to a default read voltage Rndef between the threshold voltage distributions of the "S(n−1)" state and the "Sn" state.

FIG. 6B illustrates a relationship between the number of ON-cells and the read voltage immediately after the data write process. When the expected value of the number of memory cell transistors MT in each of the states is E, the voltage Rndef is a voltage close to an optimal read voltage at which the number of ON-cells is n×E.

However, the threshold voltage of the memory cell transistor MT may vary due to error factors such as disturbance or data retention. As a result, a distribution width of the threshold voltages in each of the states may spread, a mode of the threshold voltage distribution in each of the states may change, or the threshold voltage distribution in each of the states may shift. As a result of such changes of the threshold voltage distribution, as illustrated in FIG. 7A, the adjacent distributions may overlap each other. When the adjacent distributions overlap each other, data different from that during the data write process is read from the memory cell transistors MT, which corresponds to a thick oblique line portion and a thin oblique line portion in FIG. 7A. More specifically, among the memory cell transistors MT of the threshold voltage distribution in the "S(n−1)" state, read data of a memory cell transistor MT having a threshold voltage higher than or equal to the read voltage Rndef is a fail bit. In addition, among the memory cell transistors MT of the threshold voltage distribution in the "Sn" state, read data of a memory cell transistor MT having a threshold voltage lower than the read voltage Rndef is a fail bit. When the number of fail bits exceeds the number of correctable error bits of the ECC circuit 34, data cannot be corrected.

When the read voltage can be appropriately shifted, the number of fail bits can be reduced. Examples of a method of determining the shift amount include a method of using the number of ON-cells. FIG. 7B illustrates a relationship between the number of ON-cells and the read voltage when the adjacent distributions overlap each other. By using a read voltage Rnopt at which the number of ON-cells is n×E, the number of fail bits can be reduced. Specifically, in FIG. 7A, by using the read voltage Rnopt, the number of fail bits can be reduced by the number of memory cell transistors MT corresponding to the thin oblique line portion, as compared to a case where the read voltage Rndef is used.

This way, a data read process that is executed by using, as the read voltage, a voltage shifted from the default read voltage by a certain voltage will be referred to as the shift read process. The shift amount information 21 described above is a group of shift amounts used for the shift read process.

In addition, an operation of searching for the shift amount used for the shift read process will be referred to as the tracking process.

The tracking process may be classified into a system tracking process that is executed by the memory controller 30 controlling the nonvolatile memory 10 and an on-chip tracking process that is executed by the nonvolatile memory 10 itself.

In the system tracking process, the memory controller 30 transmits a read command to the nonvolatile memory 10 such that the nonvolatile memory 10 executes a data read operation. The memory controller 30 receives read data from the nonvolatile memory 10 and searches for the shift amount based on the read data.

In the system tracking process, the memory controller 30 searches for the shift amount. As a result, a complex and high-level tracking process can be executed.

On the other hand, in the on-chip tracking process, the memory controller 30 transmits an on-chip tracking command and a shift amount to the nonvolatile memory 10. The nonvolatile memory 10 that receives the on-chip tracking command and the shift amount executes a data read operation, and searches for a more suitable shift amount based on the read data, for example from the shift amount received as a starting point. When the search of the shift amount ends, the nonvolatile memory 10 transmits the shift amount information to the memory controller 30.

The on-chip tracking process is executed by the nonvolatile memory 10 alone except for exchanging the command and the result. As a result, the tracking process can be executed within a short period of time.

<1-2-2> Patrol Operation

The memory system 3 according to the first embodiment executes the patrol process, for example, in a period where a command from the host is not executed. The patrol process includes the tracking process and the shift read process. The details of the patrol process will be described.

Figure 8:
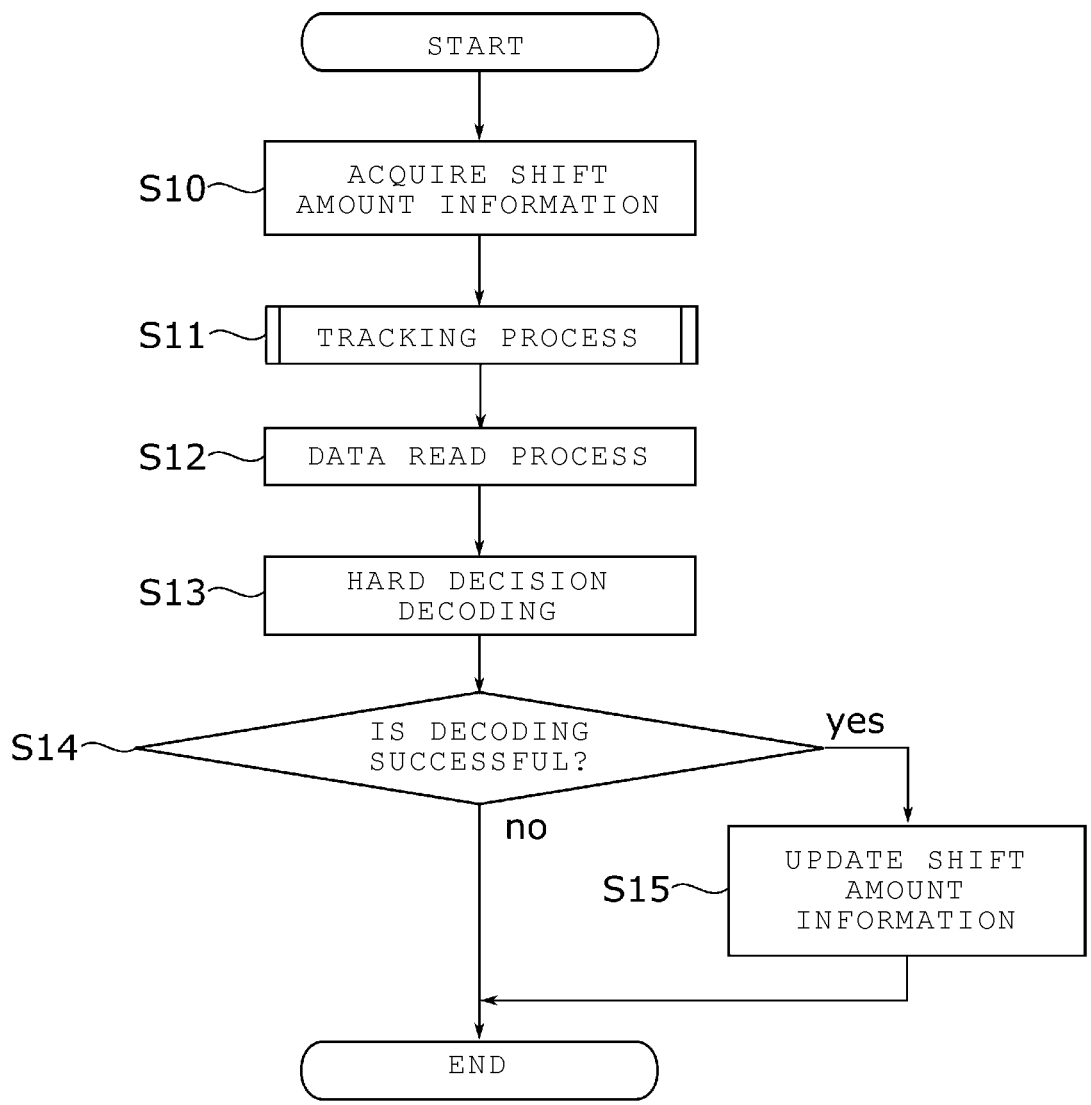
FIG. 8 is a flowchart illustrating an example of a patrol process in the memory system according to the first embodiment.

FIG. 8 is a flowchart illustrating an example of the patrol process in the memory system according to the first embodiment.

When the patrol process starts (START), the memory controller 30 acquires the shift amount information 21 (S10). Specifically, the memory controller 30 reads the shift amount information 21 from the volatile memory 20.

The memory controller 30 executes the tracking process (S11). Specifically, the memory controller 30 executes the tracking process based on the acquired shift amount information 21. The tracking process is a process of reading data from the nonvolatile memory 10 and searching for a new shift amount. The details of the tracking process will be described below. As a result of the tracking process, the memory controller 30 acquires the newly obtained shift amount information.

The memory controller 30 causes the nonvolatile memory 10 to execute a data read process (S12). Specifically, the memory controller 30 causes the nonvolatile memory 10 to execute the data read process using the shift amount information acquired in the tracking process. As a result of executing the data read process, the memory controller 30 acquires the read data.

In Step S13, the ECC circuit 34 of the memory controller 30 executes hard decision decoding on the data acquired in the data read process.

The memory controller 30 determines whether the decoding is successful (S14).

When the decoding is successful (S14, Yes), the memory controller 30 updates the shift amount information 21 (S15). Specifically, the memory controller 30 updates the shift amount information 21 in the volatile memory 20 such that the default shift amount information 21 is overwritten with the shift amount information acquired in the process of Step S11. The patrol process ends (END).

When the decoding is not successful (S14, No), the patrol process ends (END).

Next, the details of the tracking process will be described. The tracking process is a process of searching for a suitable shift amount for each of the read voltages R1 to R7. In order to simplify the description, a case of searching for the shift amount for a read voltage Rn will be described as an example, where n represents an integer of 1 or larger and 7 or smaller.

Figure 9:
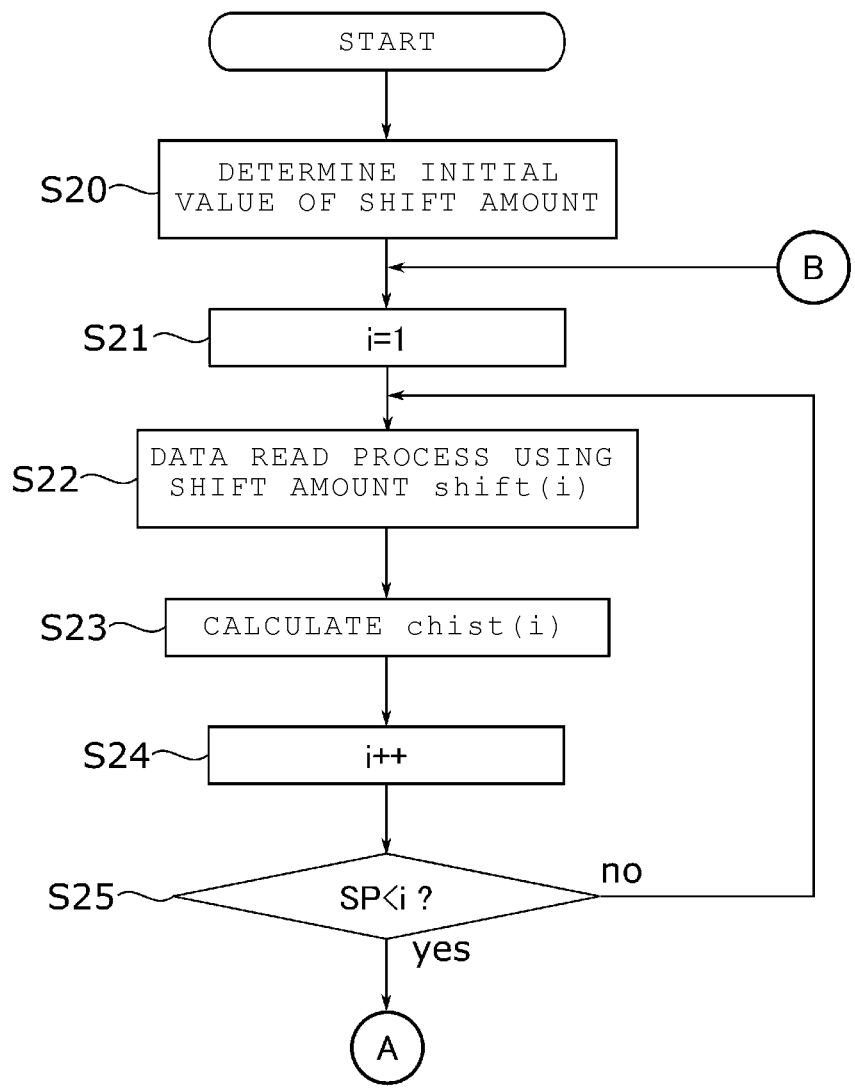
FIG. 9 is a flowchart illustrating an example of a tracking process in the memory system according to the first embodiment.
Figure 10:
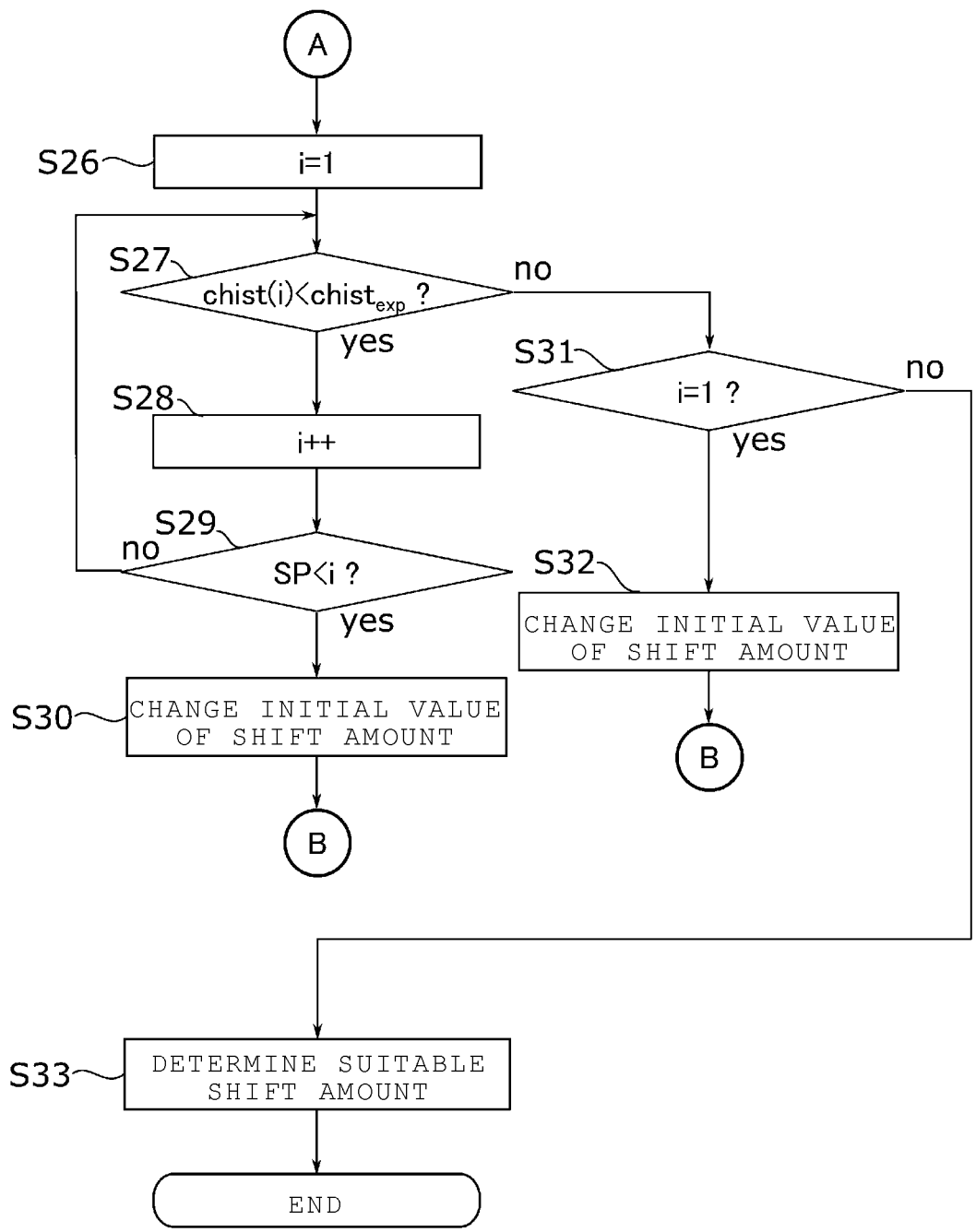
FIG. 10 is a flowchart illustrating an example of the tracking process in the memory system according to the first embodiment.

FIGS. 9 and 10 are flowcharts illustrating an example of the tracking process in the memory system according to the first embodiment.

When the tracking process starts (START), the memory controller 30 determines an initial value of the shift amount (S20). Specifically, the initial value $shift_{int}$ of the shift amount is calculated using the following Expression (1).

$$shift_{int} = shift_{hold} - ((SP - 1) \times ST \div 2) \qquad (1)$$

In Expression (1), $shift_{hold}$ represents the shift amount read from the shift amount information 21, SP represents the number of times of sampling, and ST represents a search step. The number of times of sampling SP is an integer of 2 or larger, and the search step ST is a voltage other than 0.

Figure 11:
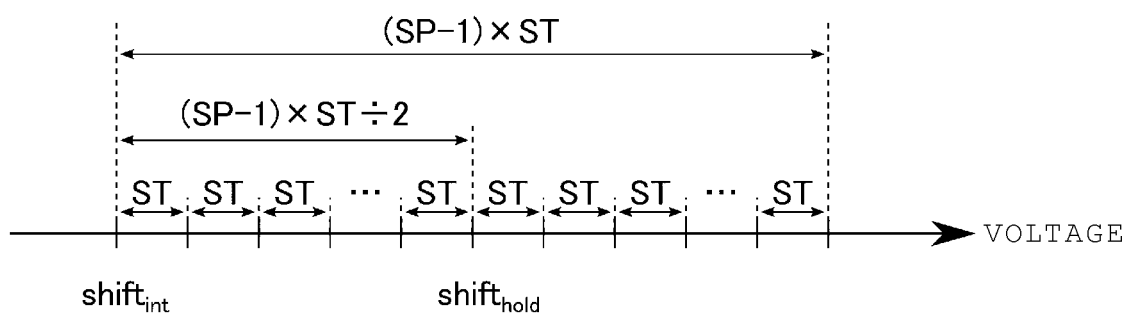
FIG. 11 is a diagram illustrating an initial value of a shift amount used in the tracking process in the memory system according to the first embodiment.

Expression (1) will be described. FIG. 11 is a diagram illustrating Expression (1). The memory system 3 according to the first embodiment searches for the suitable shift amount in the voltage range of (SP−1)×ST, around the shift amount shift$_{hold}$. Therefore, the initial value shift$_{int}$ of the shift amount is set to a voltage lower than the shift amount shift$_{hold}$ by ((SP−1)×ST=2).

Referring back to FIG. 9, the memory controller 30 resets a variable "i" to 1 (S21).

The memory controller 30 causes the nonvolatile memory 10 to execute a data read process using "shift (i)" as the shift amount (S22). Specifically, the "shift (i)" is represented by the following Expression (2).

$$\text{shift}(i) = \text{shift}_{int} + (i-1) \times ST \qquad (2)$$

The data read process is executed, for example, on one cell unit CU of one block BLK. As a result of causing the nonvolatile memory 10 to execute the data read process, the memory controller 30 acquires the read data.

Figure 12:
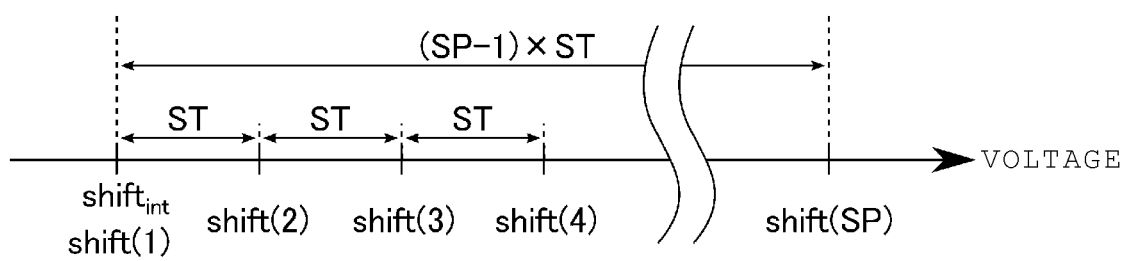
FIG. 12 is a diagram illustrating the shift amount used in the tracking process in the memory system according to the first embodiment.

Expression (2) will be described. FIG. 12 is a diagram illustrating Expression (2). In the memory system 3 according to the first embodiment, shift(1) is the same as shift$_{int}$. In addition, when i is 2 or larger, shift (i) is set to a voltage that is increased by ST whenever i increases by 1. In addition, a difference between shift(1) and shift (SP) is (SP−1)×ST that is the same as the search range.

Referring back to FIG. 9, the arithmetic circuit 37 of the memory controller 30 calculates the number of ON-cells "chist(i)" (S23). Specifically, the arithmetic circuit 37 of the memory controller 30 counts the number of ON-cells in the data read process using "shift (i)" as the shift amount, and calculates the counted number as "chist(i)". Further, the memory controller 30 stores the calculated number of ON-cells "chist(i)" in the volatile memory 20.

The memory controller 30 increments the variable "i" (S24).

The memory controller 30 determines whether the variable "i" is larger than the number of times of sampling SP (S25). When the variable "i" is not larger than the number of times of sampling SP (S25, No), the process of Step S22 is executed. That is, while the variable "i" is the number of times of sampling SP or smaller, the data read process using "shift (i)" corresponding to the incremented variable "i" is executed.

When the variable "i" is larger than the number of times of sampling SP (S25, Yes), as illustrated in FIG. 10, the memory controller 30 resets the variable "i" to 1 (S26).

The memory controller 30 determines whether the number of ON-cells "chist(i)" is smaller than an expected value "chist$_{exp}$" (S27). When the expected value of the number of memory cell transistors MT in each of the states is E and the read voltage Rn is a search target of the shift amount, the expected value "chist$_{exp}$" is E×n.

When the number of ON-cells "chist(i)" is smaller than the expected value "chist$_{exp}$" (S27, Yes), the memory controller 30 increments the variable "i" (S28).

The memory controller 30 determines whether the variable "i" is larger than the number of times of sampling SP (S29). When the variable "i" is not larger than the number of times of sampling SP (S29, No), the process of Step S27 is executed.

That is, while the variable "i" is the number of times of sampling SP or smaller, the number of ON-cells "chist(i)" corresponding to the incremented variable "i" and the expected value "chist$_{exp}$" are compared to each other. As a result, among the incremented values of the variable "i" with which the number of ON-cells "chist(i)" is larger than the expected value "chist$_{exp}$", the minimum value of the variable "i" is acquired.

When the variable "i" is larger than the number of times of sampling SP (S29, Yes), the initial value of the shift amount is changed (S30), and the process of Step S21 is executed. Specifically, (SP−1)×ST is added to shift$_{int}$, and the process of Step S21 is executed.

Figure 13:
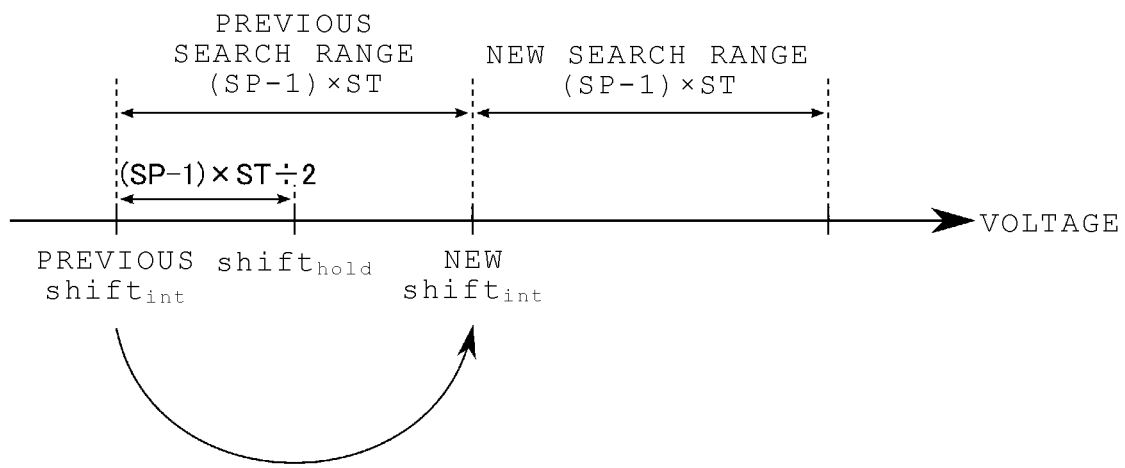
FIG. 13 is a diagram illustrating a changed initial value of the shift amount used in the tracking process in the memory system according to the first embodiment.

That is, in the previous search range, the number of ON-cells "chist(i)" that is larger than the expected value "chist$_{exp}$" was not acquired. Therefore, the initial value of the shift amount is changed such that the search can be performed with a higher voltage (S30). FIG. 13 is a diagram illustrating the initial value of the shift amount that is changed in Step S30. As illustrated in FIG. 13, (SP−1)×ST is added to the previous shift$_{int}$. As a result, the initial value of the shift amount is changed such that the end point of the previous search becomes a starting point of a new search.

Referring back to FIG. 10, in the process of Step S27, when the number of ON-cells "chist(i)" is not smaller than the expected value "chist$_{exp}$" (S27, No), the memory controller 30 determines whether the variable "i" is 1 (S31). The reason for this is as follows. When the variable "i" is 1, the number of ON-cells "chist(1)" at the starting point of the search is larger than the expected value "chist$_{exp}$". That is, this case shows that the search range is excessively high.

When the variable "i" is 1 (S31, Yes), the initial value of the shift amount is changed (S32), and the process of Step S21 is executed. Specifically, (SP−1)× ST is subtracted from shift$_{int}$, and the process of Step S21 is executed.

Figure 14:
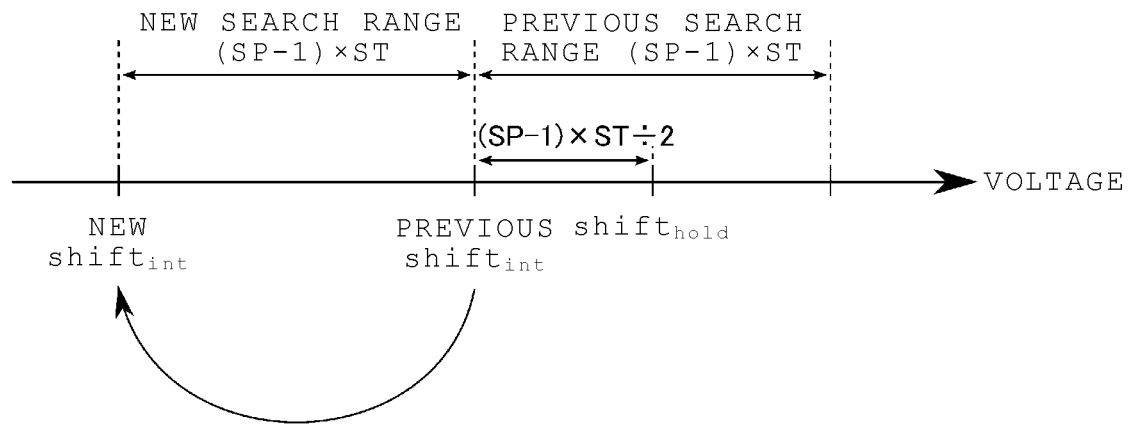
FIG. 14 is a diagram illustrating another changed initial value of the shift amount used in the tracking process in the memory system according to the first embodiment.

That is, in the previous search range, the number of ON-cells "chist(i)" that is smaller than the expected value "chist$_{exp}$" was not acquired. Therefore, the initial value of the shift amount is changed such that the search can be performed with a lower voltage (S32). FIG. 14 is a diagram illustrating the initial value of the shift amount that is changed in Step S32. As illustrated in FIG. 14, (SP−1)×ST is subtracted from the previous shift$_{int}$. As a result, the initial value of the shift amount is changed such that the starting point of the previous search is an end point of a new search.

Referring back to FIG. 10, it can be seen that, when the determination of Step S27 is No and the determination of Step S31 is No, the number of ON-cells "chist(i)" at a voltage other than the starting point of the search range exceeds the expected value "chist$_{exp}$". That is, two values of the variable "i" (that is, the current value "i" and the value "i−1") corresponding to two numbers of ON-cells "chist(i)" between which the expected value "chist$_{exp}$" is interposed are acquired. As a result, the memory controller 30 can determine the suitable shift amount.

When the variable "i" is not 1 (S31, No), the memory controller 30 determines the suitable shift amount (S33). Specifically, the suitable shift amount is calculated from the following Expression (3).

$$\text{shift}_{opt} = \qquad (3)$$
$$\text{shift}(i-1) + ST \times (chist_{exp} - chist(i-1)) \div (chist(i) - chist(i-1))$$

During the calculation, the memory controller 30 reads the number of ON-cells "chist(i−1)" from the volatile memory 20.

Figure 15:
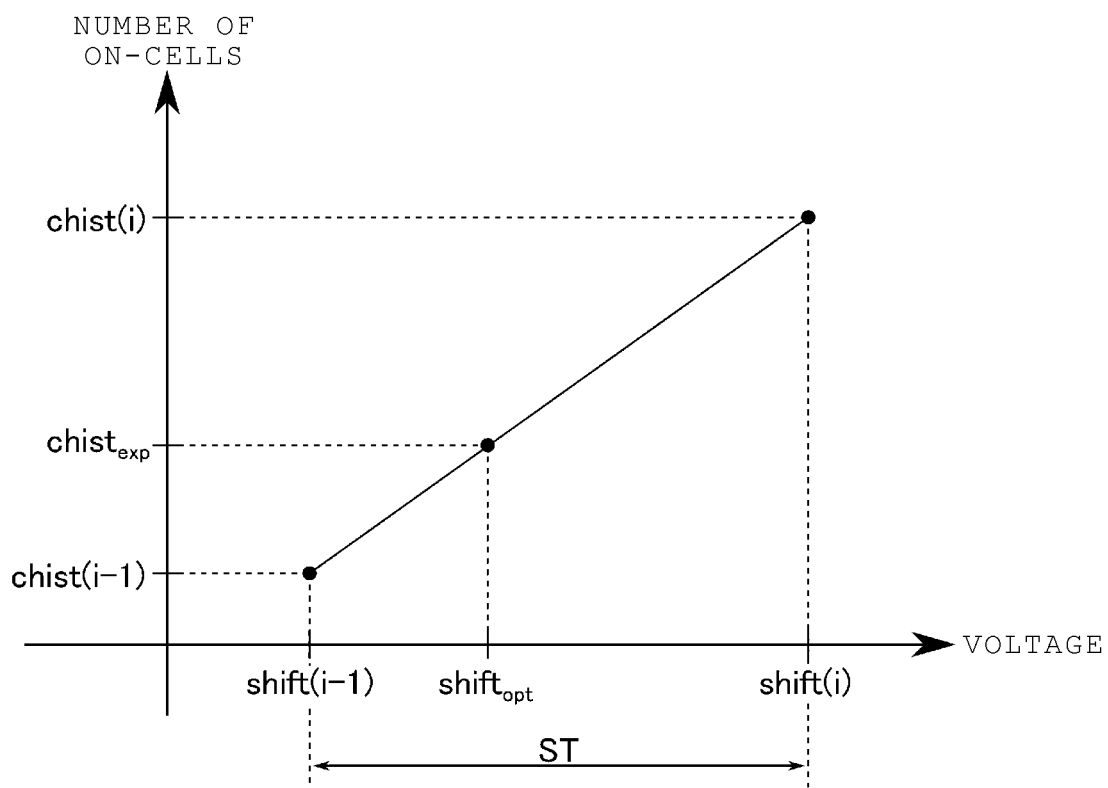
FIG. 15 is a diagram illustrating a suitable shift amount calculated in the tracking process in the memory system according to the first embodiment.

Expression (3) will be described. FIG. 15 is a diagram illustrating Expression (3). Since the numbers of ON-cells "chist(i−1)" and "chist(i)" and the expected value "chist$_{exp}$"

are known, the memory controller 30 can acquire the number of ON-cells between "chist(i−1)" and "chist(i)" and the number of ON-cells between "chist(i−1)" and "chist$_{exp}$". Using these results, the memory controller 30 can acquire an internal ratio between the distributions of the numbers of ON-cells [(chist$_{exp}$−chist(i−1))÷(chist(i)−chist(i−1))]. By multiplying this internal ratio by the search step ST and adding the result of the multiplication to the shift amount "shift(i−1)", the memory controller 30 can calculate the suitable shift amount "shift$_{opt}$".

Referring back to FIG. 10, when the suitable shift amount is determined (S33), a series of processes ends (END). As described above with reference to FIG. 8, the memory controller 30 executes the data read process (S12) and the hard decision process (S13) using the shift amount determined in the tracking process. When the decoding is successful (S14, Yes), the default shift amount information 21 is overwritten with the shift amount.

<1-2-3> Host Read Operation

The details of a host read process will be described. The host read process is a data read process that is executed based on a read request from the host apparatus.

Figure 16:
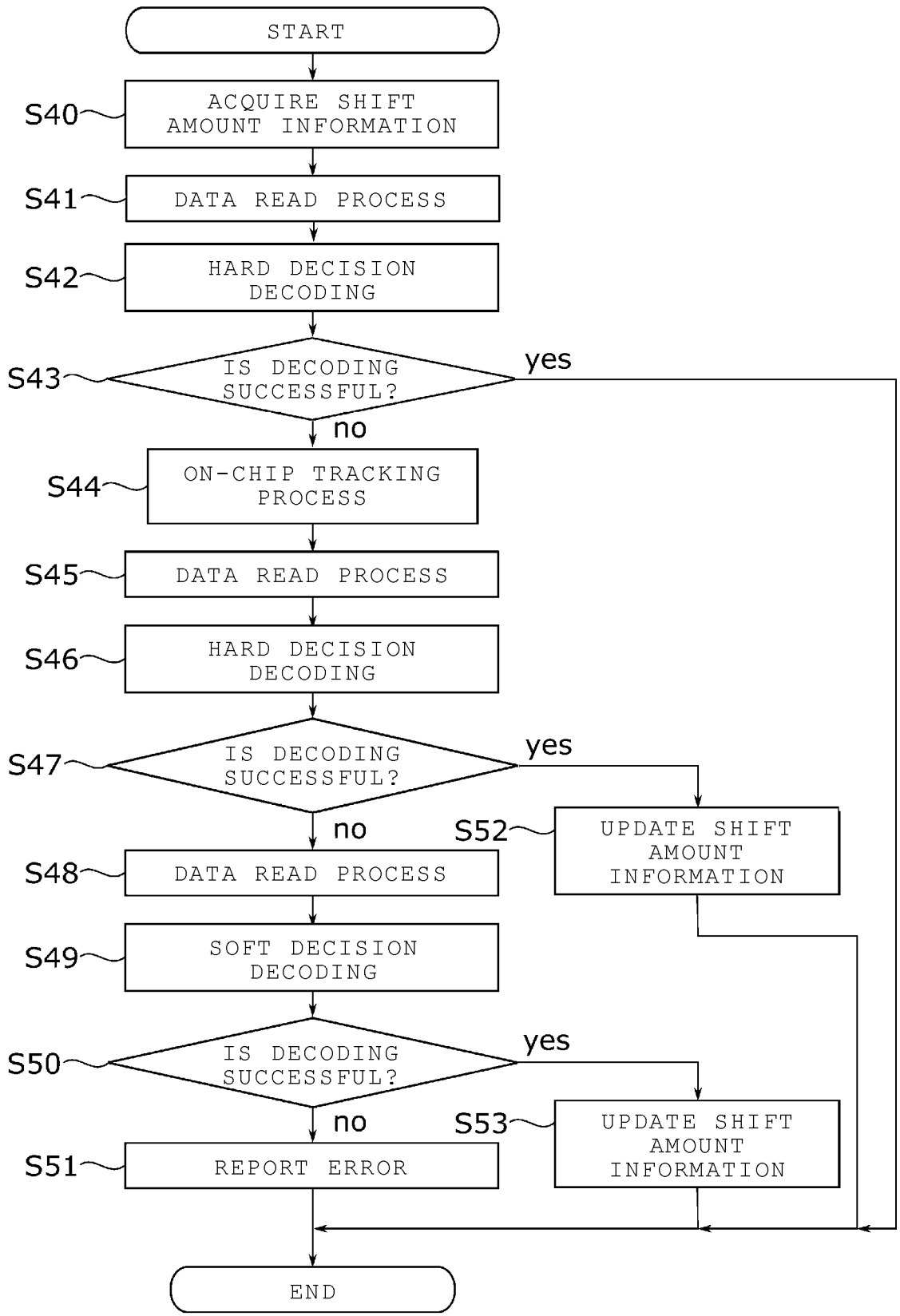
FIG. 16 is a flowchart illustrating an example of a host read process in the memory system according to the first embodiment.

FIG. 16 is a flowchart illustrating an example of the host read process in the memory system according to the first embodiment.

When the read request is received from the host apparatus 2 (START), the memory controller 30 acquires the shift amount information 21 (S40). Specifically, the memory controller 30 reads the shift amount information 21 from the volatile memory 20.

The memory controller 30 causes the nonvolatile memory 10 to execute a data read process (S41). Specifically, the memory controller 30 causes the nonvolatile memory 10 to execute the data read process using the shift amount stored in the shift amount information 21. As a result of executing the data read process, the memory controller 30 acquires read data.

In Step S42, the ECC circuit 34 of the memory controller 30 executes hard decision decoding on the data acquired in the data read process.

The memory controller 30 determines whether the decoding is successful (S43). When the decoding is successful (S43, Yes), the memory controller 30 transmits the decoded read data to the host apparatus 2, and ends the host read process (END).

When the decoding is not successful (S43, No), the memory controller 30 causes the nonvolatile memory 10 to execute the on-chip tracking process (S44). Specifically, the memory controller 30 transmits the shift amount information 21 acquired in the process of Step S40 and an on-chip tracking command to the nonvolatile memory 10, and causes the nonvolatile memory 10 to execute the on-chip tracking process. Shift amount information acquired in the on-chip tracking process is transmitted from the nonvolatile memory 10 to the memory controller 30.

The memory controller 30 causes the nonvolatile memory 10 to execute a data read process (S45). Specifically, the memory controller 30 causes the nonvolatile memory 10 to execute the data read process using the received shift amount information. As a result of executing the data read process, the memory controller 30 acquires read data.

In Step S46, the ECC circuit 34 of the memory controller 30 executes hard decision decoding on the data acquired in the data read process.

The memory controller 30 determines whether the decoding is successful (S47). When the decoding is not successful (S47, No), the memory controller 30 causes the nonvolatile memory 10 to execute a data read process (S48). Specifically, the memory controller 30 causes the nonvolatile memory 10 to execute a data read process for the soft decision decoding. As a result of executing the data read process, the memory controller 30 acquires read data.

In Step S49, the ECC circuit 34 of the memory controller 30 executes the soft decision decoding on the data acquired in the data read process.

The memory controller 30 determines whether the decoding is successful (S50). When the decoding is not successful (S50, No), the memory controller 30 reports error to the host apparatus 2 (S51). Specifically, the memory controller 30 reports uncorrectable error to the host apparatus 2. The host read process ends (END).

When the decoding is successful in the process of Step S47 or Step S50 (S47 or S50, Yes), the memory controller 30 updates the shift amount information 21 (S52 or S53). Specifically, the memory controller 30 updates the shift amount information 21 in the volatile memory 20 such that the default shift amount information 21 is overwritten with the shift amount information acquired in the process of Step S44. The decoded read data is transmitted to the host apparatus 2, and the host read process ends (END).

<1-3> Effect

In the memory system according to the first embodiment described above, the operating speed can be improved.

The memory system according to the first embodiment executes the tracking process irrespective of a request from the host apparatus, executes a data read process using the acquired shift amount information, and updates the shift amount information 21 when error correction is successful. That is, the memory system according to the first embodiment can update the shift amount information 21 such that the current state of the nonvolatile memory 10 is reflected. The memory system according to the first embodiment executes the on-chip tracking process based on the shift amount information 21 when error correction of read data fails in the host read process. As a result, the memory system according to the first embodiment can rapidly search for more suitable shift amount information. Accordingly, the memory system according to the first embodiment can improve the operating speed.

<2> Second Embodiment

A configuration of a memory system according to a second embodiment is different from the memory system of the first embodiment in the configuration of the volatile memory 20 and the tracking process. Hereinafter, regarding the memory system according to the second embodiment, points different from the first embodiment will be described.

<2-1> Configuration

<2-1-1> Memory System

Figures 17, 18:
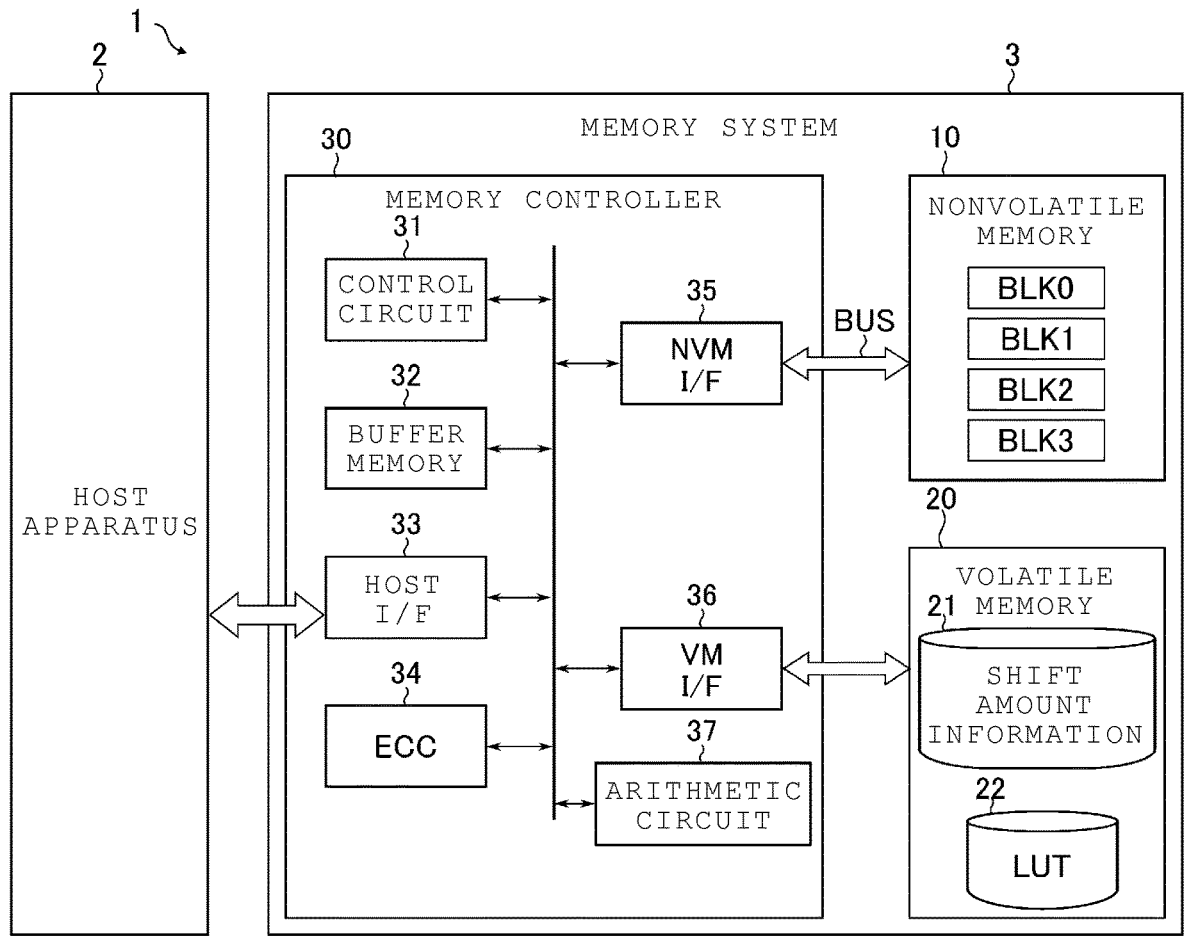
FIG. 17 is a block diagram illustrating a configuration of an information processing system according to a second embodiment.
FIG. 18 is a diagram illustrating an example of a configuration of a lookup table used in the memory system according to the second embodiment.

FIG. 17 is a block diagram illustrating a configuration of an information processing system according to the second embodiment. In the memory system 3 according to the second embodiment, the volatile memory 20 further stores a lookup table (LUT) 22 as compared to the memory system 3 according to the first embodiment.

FIG. 18 is a diagram illustrating an example of a configuration of the lookup table used in the memory system according to the second embodiment. As illustrated in FIG. 18, the LUT 22 stores differences in the number of ON-cells ΔC1, ΔC2, ΔC3, . . . and amounts of change in read voltage ΔVR1, ΔVR2, ΔVR3, . . . . The LUT 22 is used in the tracking process. The LUT 22 associates the difference in the number of ON-cells and the amount of change in read voltage with each other. This association is experimentally acquired, for example, before the shipping of the memory system 3. For example, when the number of ON-cells is desired to be increased by a certain number, the memory controller 30 can learn the amount of change in read voltage corresponding to the certain number by referring to the LUT 22. The LUT 22 may associate the difference in the number of ON-cells and the amount of change in read voltage with each other for each of the read voltages R1 to R7. The LUT 22 may further associate the difference in the number of ON-cells and the amount of change in read voltage with each other for each of the blocks.

<2-2> Operation

Next, an operation of the memory system according to the second embodiment will be described. The details of the tracking process will be described. In order to simplify the description, a case of searching for the shift amount for a read voltage Rn will be described as an example. Here, "n" represents an integer of 1 or larger and 7 or smaller.

Figure 19:
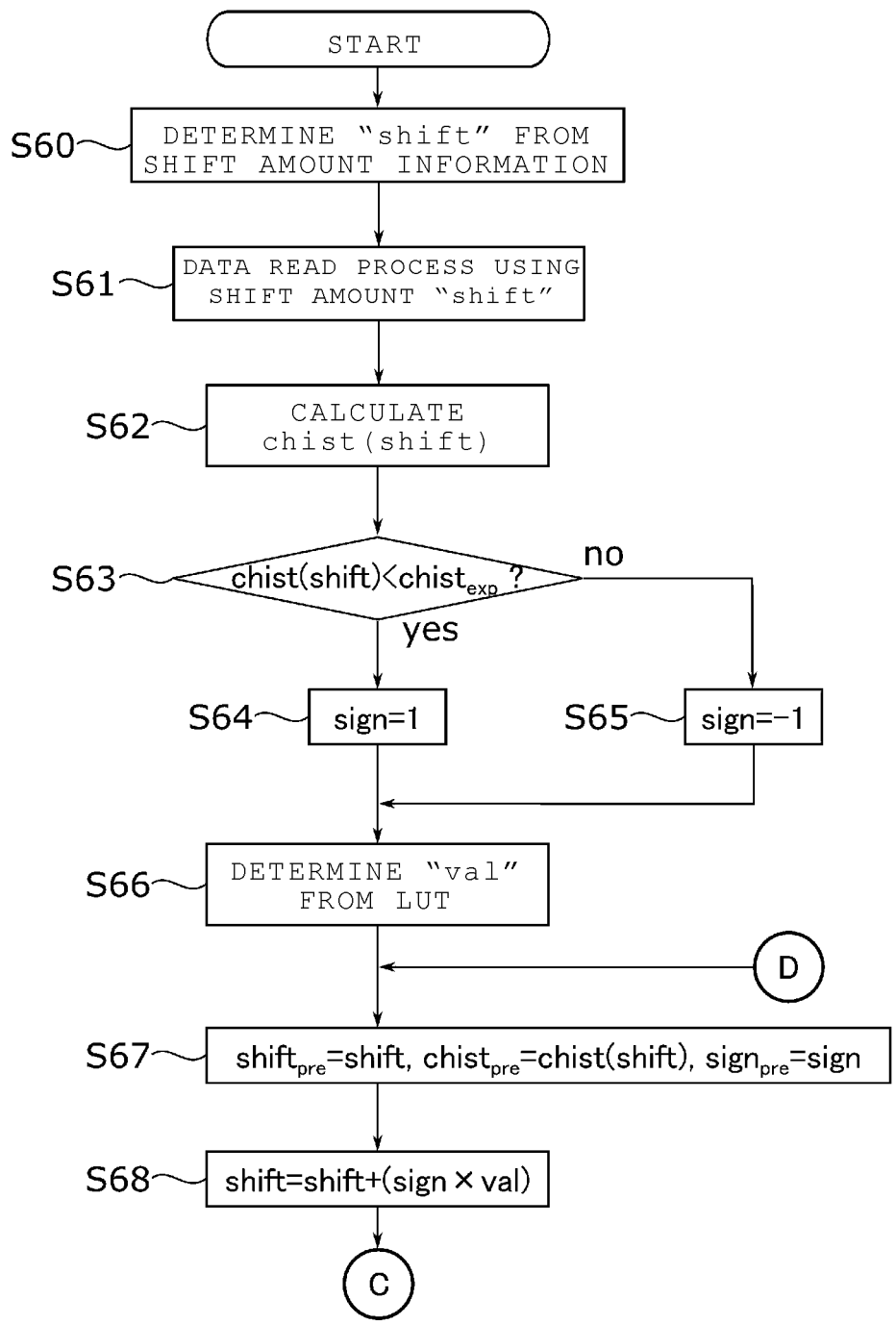
FIG. 19 is a flowchart illustrating an example of a tracking process in the memory system according to the second embodiment.
Figure 20:
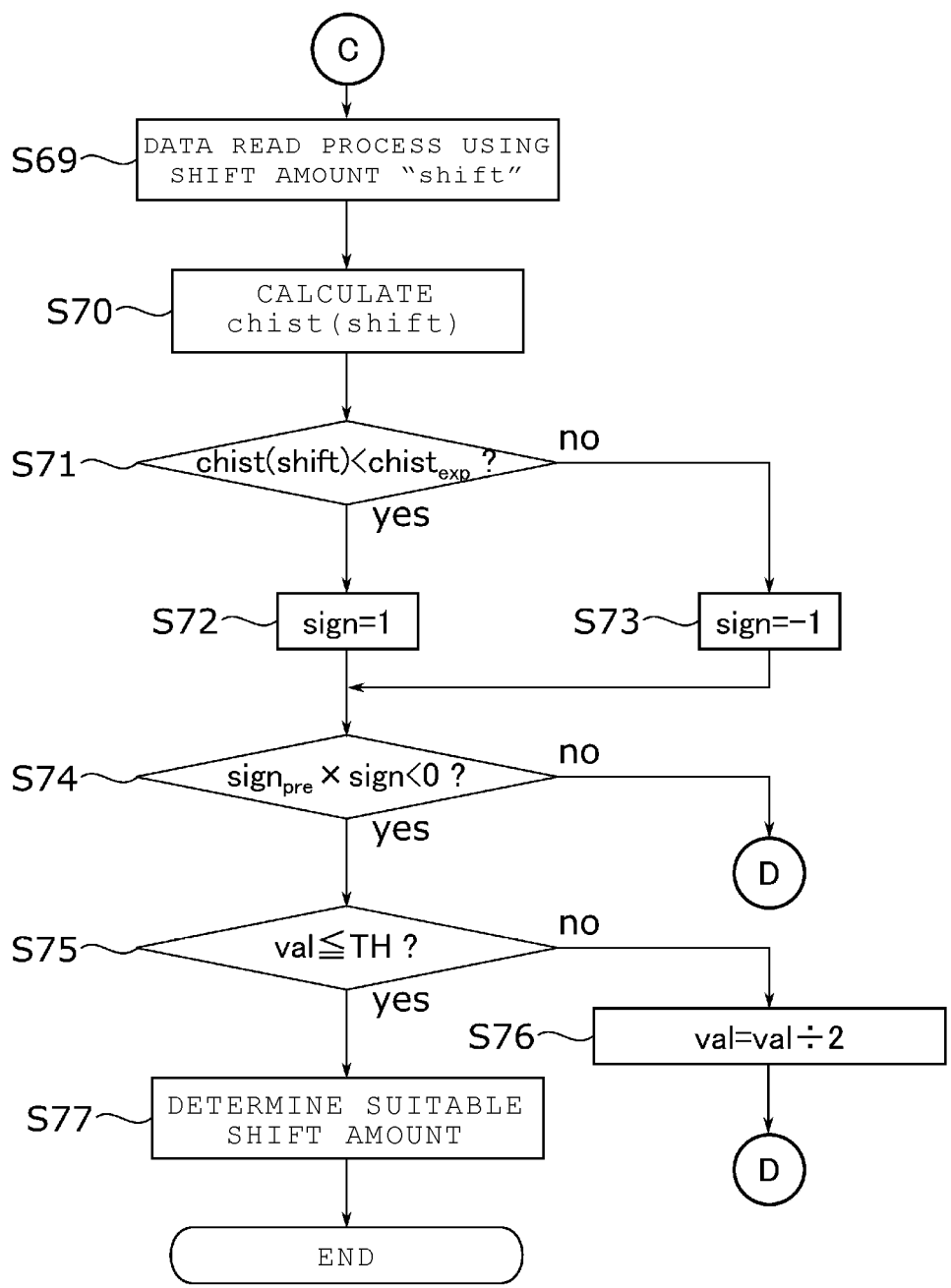
FIG. 20 is a flowchart illustrating an example of the tracking process in the memory system according to the second embodiment.

FIGS. 19 and 20 are flowcharts illustrating an example of the tracking process in the memory system according to the second embodiment.

When the tracking process starts (START), the memory controller 30 determines a shift amount "shift" from the shift amount information 21 (S60). Specifically, the memory controller 30 determines, from the shift amount information 21, the shift amount "shift" based on a block BLK that includes a memory cell transistor MT for which the shift amount is to be searched, and a read voltage at which the shift amount is to be searched.

The memory controller 30 causes the nonvolatile memory 10 to execute a data read process using "shift" as the shift amount (S61). The data read process is executed, for example, on one cell unit CU of one block BLK. As a result of causing the nonvolatile memory 10 to execute the data read process, the memory controller 30 acquires read data.

The arithmetic circuit 37 of the memory controller 30 calculates the number of ON-cells "chist(shift)" (S62). Specifically, the arithmetic circuit 37 of the memory controller 30 counts the number of ON-cells in the data read process using "shift" as the shift amount, and calculates the counted number as "chist(shift)".

The memory controller 30 determines whether the number of ON-cells "chist(shift)" is smaller than the expected value "$chist_{exp}$" (S63). When the number of ON-cells "chist (shift)" is smaller than the expected value "$chist_{exp}$" (S63, Yes), the memory controller 30 sets 1 into a variable "sign" (S64).

When the number of ON-cells "chist(shift)" is not smaller than the expected value "$chist_{exp}$" (S63, No), the memory controller 30 sets −1 into the variable "sign" (S65).

This way, 1 or −1 is set into the variable "sign" based on a magnitude relationship between the number of ON-cells "chist(shift)" and the expected value "$chist_{exp}$".

The memory controller 30 determines a differential shift amount "val" from the LUT 22 (S66). Specifically, the memory controller 30 refers to the LUT 22 to determine the differential shift amount "val" from a difference between the number of ON-cells "chist(shift)" and the expected value "$chist_{exp}$".

The memory controller 30 stores each of the values of the shift amount "shift", the number of ON-cells "chist(shift)", and the variable "sign" (S67). More specifically, the memory controller 30 sets the shift amount "shift" into a shift amount "$shift_{pre}$", sets the number of ON-cells "chist(shift)" into the number of ON-cells "$chist_{pre}$", and sets the variable "sign" into a variable "$sign_{pre}$" (S67).

The memory controller 30 adds a value obtained by multiplying the variable "sign" by the differential shift amount "val" to the shift amount "shift" (S68).

To the variable "sign", 1 or −1 is set based on a magnitude relationship between the number of ON-cells "chist(shift)" and the expected value "$chist_{exp}$". Therefore, the process of Step S68 is a process of adding or subtracting the differential shift amount "val" to or from the shift amount "shift". Specifically, when the number of ON-cells "chist(shift)" is smaller than the expected value "$chist_{exp}$", the process of Step S68 is the addition. That is, the shift amount "shift" is set to a value increased by the differential shift amount "val" such that the number of ON-cells "chist(shift)" increases. On the other hand, when the number of ON-cells "chist(shift)" is not smaller than the expected value "$chist_{exp}$", the process of Step S68 is the subtraction. That is, the shift amount "shift" is set to a value decreased by the differential shift amount "val" such that the number of ON-cells "chist(shift)" decreases.

As illustrated in FIG. 20, the memory controller 30 causes the nonvolatile memory 10 to execute a data read process using "shift" as the shift amount (S69). As a result of causing the nonvolatile memory 10 to execute the data read process, the memory controller 30 acquires read data.

The arithmetic circuit 37 of the memory controller 30 calculates the number of ON-cells "chist(shift)" (S70).

The memory controller 30 determines again whether the number of ON-cells "chist(shift)" is smaller than the expected value "$chist_{exp}$" (S71). When the number of ON-cells "chist(shift)" is smaller than the expected value "$chist_{exp}$" (S71, Yes), the memory controller 30 sets 1 into the variable "sign" (S72).

When the number of ON-cells "chist(shift)" is not smaller than the expected value "$chist_{exp}$" (S71, No), the memory controller 30 sets −1 into the variable "sign" (S73).

The memory controller 30 determines whether the value obtained by multiplying the variable "$sign_{pre}$", which is stored in Step S67, by the variable "sign", into which the value is set in Step S72 or Step S73, is smaller than 0 (S74). When the value obtained by multiplying the variable "$sign_{pre}$" and the variable "sign" is smaller than 0 (S74, Yes), the process of Step S75 is executed. When the value obtained by multiplying the variable "$sign_{pre}$" and the variable "sign" is not smaller than 0 (S74, No), the process of Step S67 is executed.

In Step S74, the memory controller 30 determines whether a first magnitude relationship between the number of ON-cells "chist(shift)" and the expected value "$chist_{exp}$" and a second magnitude relationship between the number of ON-cells "$chist_{pre}$" and the expected value "$chist_{exp}$" are different from each other.

Specifically, when the magnitude relationships are different from each other, the multiplication result of the variable "$sign_{pre}$" and the variable "sign" is −1. This case shows that the expected value "$chist_{exp}$" is present between the numbers of ON-cells "$chist_{pre}$" and "chist(shift)". That is, two shift amounts (that is, the current value "shift" and the value "$shift_{pre}$") corresponding to two numbers of ON-cells between which the expected value "$chist_{exp}$" is interposed are acquired. In this case, the determination of Step S74 is Yes, and the process of Step S75 is executed.

On the other hand, when the magnitude relationships are the same as each other, the multiplication result of the variable "$sign_{pre}$" and the variable "sign" is 1. This case shows that the expected value "$chist_{exp}$" is larger than the numbers of ON-cells "$chist_{pre}$" and "chist(shift)" or that the expected value "$chist_{exp}$" is smaller than the numbers of ON-cells "chist$_{pre}$" and "chist(shift)". In this case, the determination of Step S74 is No, and the process of Step S67 is executed again. In the next Step S68, the addition or the subtraction of the differential shift amount "val" is executed.

The memory controller 30 determines whether the differential shift amount "val" is a threshold TH or smaller (S75). When the differential shift amount "val" is not the threshold TH or smaller (S75, No), the memory controller 30 divides the differential shift amount "val" by 2 (S76), and executes the process of Step S67 again.

In Step S75, the memory controller 30 determines whether the differential shift amount "val" that is an interval between the shift amounts "shift$_{pre}$" and "shift" is the threshold TH or smaller. In the calculation of the shift amount described below, when the differential shift amount "val" is large, the calculation may have relatively large error. Therefore, the memory controller 30 checks whether the sufficient small differential shift amount "val" is acquired. That is, when the differential shift amount "val" is the threshold TH or smaller, the process proceeds to Step S77. Otherwise, the process of Step S76 is executed, and the processes after Step S67 are executed again using the differential shift amount "val" divided by 2.

When the differential shift amount "val" is the threshold TH or smaller (S75, Yes), the memory controller 30 determines the suitable shift amount (S77). Specifically, the memory controller 30 calculates the suitable shift amount from the following Expression (4).

$$\text{shift}_{opt} = \text{shift}_{pre} + (\text{shift} - \text{shift}_{pre}) \times (\text{chist}_{exp} - \text{chist}_{pre}) \div (\text{chist(shift)} - \text{chist}_{pre}) \quad (4)$$

The series of processes end (END).

Figure 21:
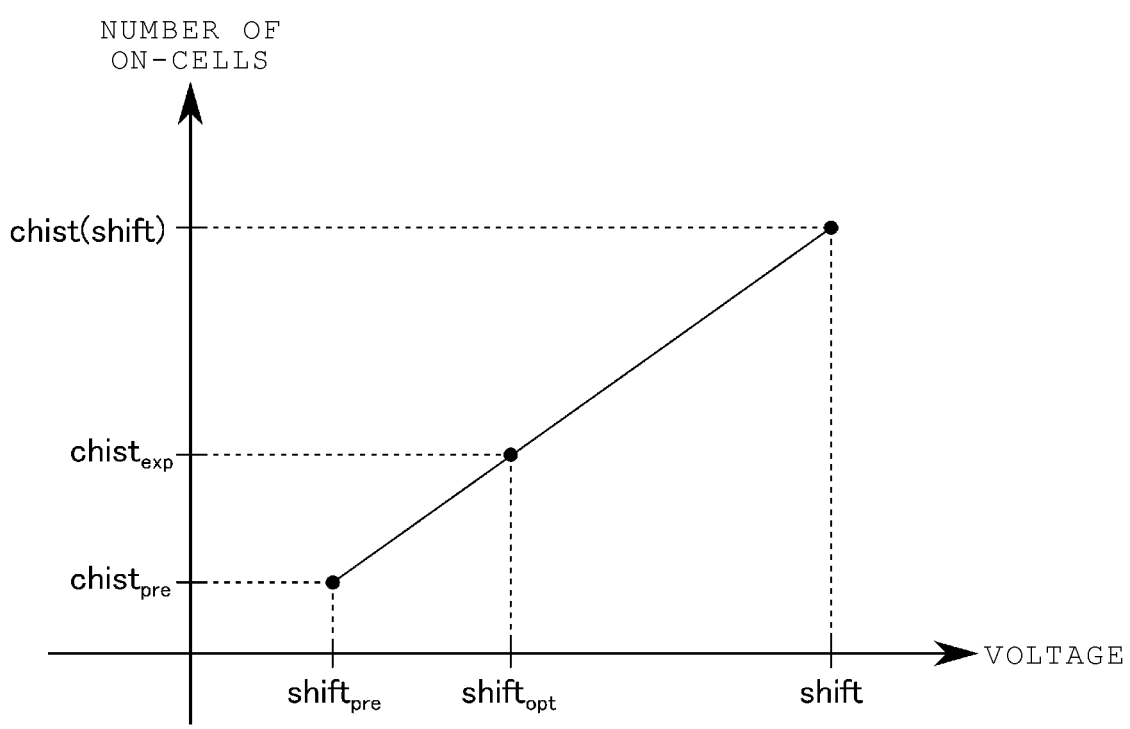
FIG. 21 is a diagram illustrating a suitable shift amount calculated in the tracking process in the memory system according to the second embodiment.

Expression (4) will be described. FIG. 21 is a diagram illustrating Expression (4). Since the numbers of ON-cells "chist$_{pre}$" and "chist(shift)" and the expected value "chist$_{exp}$" are known, the memory controller 30 can acquire the number of ON-cells between "chist(shift)" and "chist$_{pre}$" and the number of ON-cells between "chist(shift)" and "chist$_{exp}$". Using these results, the memory controller 30 can acquire an internal ratio between the distributions of the numbers of ON-cells [(chist$_{exp}$−chist$_{pre}$)÷(chist(shift)−chist$_{pre}$)]. By multiplying this internal ratio by a difference between the shift amounts "shift" and "shift$_{pre}$" and adding the multiplication result to the shift amount "shift$_{pre}$", the memory controller 30 can calculate the suitable shift amount "shift$_{opt}$".

Figure 22:
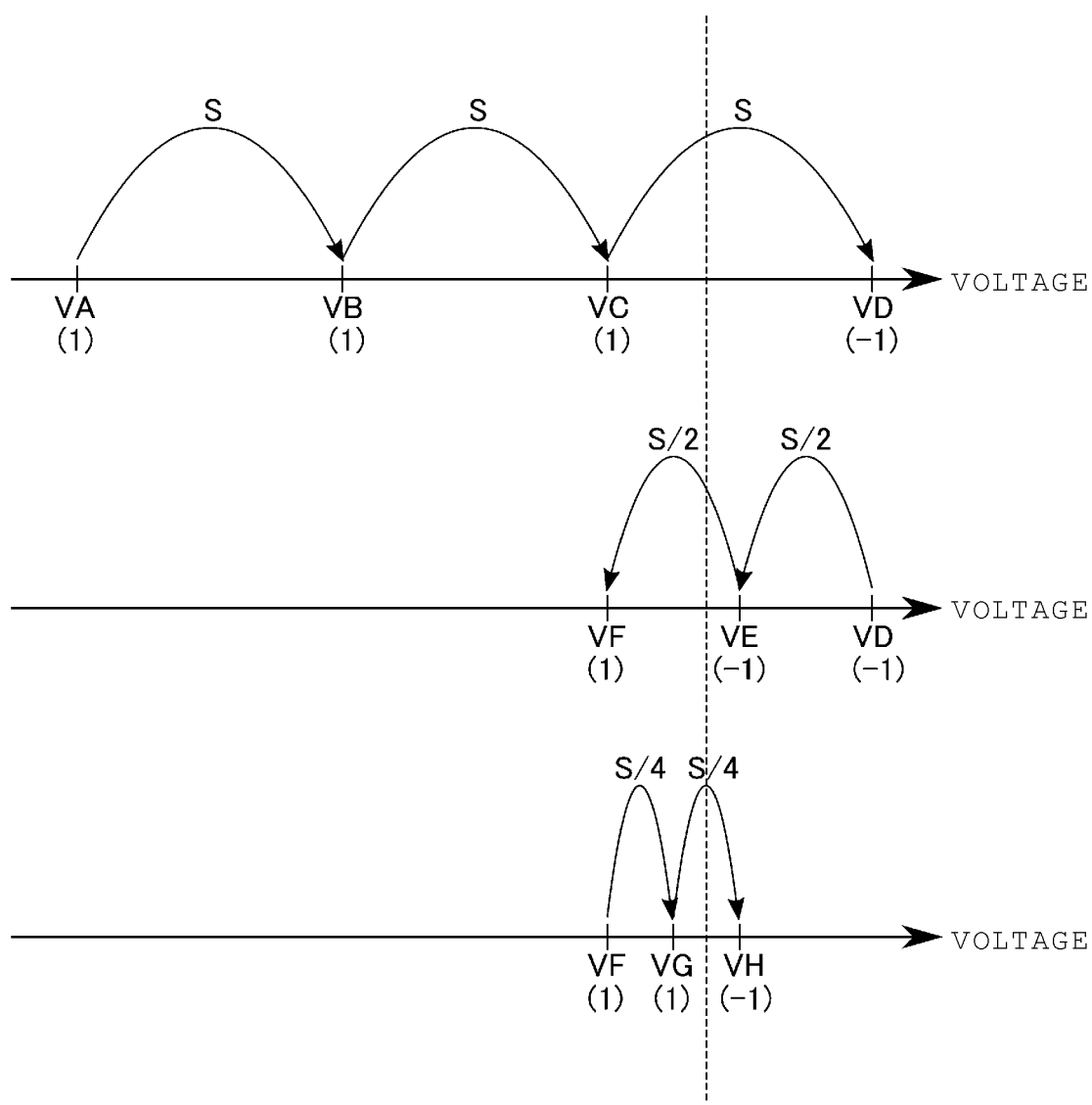
FIG. 22 is a diagram illustrating a specific example of the tracking process in the memory system according to the second embodiment.

Regarding the tracking process in the memory system according to the second embodiment, an operation will be described in detail using a specific example. FIG. 22 is a diagram illustrating the specific example of the tracking process in the memory system according to the second embodiment. In FIG. 22, the process of Step S68 described with reference to FIG. 19 is indicated by arrows. In addition, the value of the variable "sign" at each of read voltages is added with parentheses. In addition, when the read voltage is higher than a voltage indicated by a broken line, it is assumed that the number of ON-cells "chist(shift)" exceeds the expected value "chist$_{exp}$". In addition, it is assumed that the threshold TH is S/3.

In the example illustrated in FIG. 22, a read voltage VA is determined using the shift amount "shift" from the shift amount information 21 (S60 of FIG. 19). At the read voltage VA, the number of ON-cells "chist(shift)" is smaller than the expected value "chist$_{exp}$", and thus the variable "sign" is 1. A voltage S as the differential shift amount "val" is determined (S66 of FIG. 19).

The voltage S is added to the voltage VA, and a read voltage based on the new shift amount is a voltage VB (S68 of FIG. 19). Even at the read voltage VB, the number of ON-cells "chist(shift)" is smaller than the expected value "chist$_{exp}$", and thus the variable "sign" is 1. Since both of the variables "sign$_{pre}$" (that is, the variable "sign" corresponding to the read voltage VA) and "sign" are 1 (S74 of FIG. 20, No), the read voltage based on the new shift amount is determined again.

The voltage S is added to the voltage VB, and a read voltage based on the new shift amount is a voltage VC (S68 of FIG. 19). Even at the read voltage VC, the number of ON-cells "chist(shift)" is smaller than the expected value "chist$_{exp}$", and thus the variable "sign" is 1. Since both of the variables "sign$_{pre}$" (that is, the variable "sign" corresponding to the read voltage VB) and "sign" are 1 (S74 of FIG. 20, No), the read voltage based on the new shift amount is determined again.

The voltage S is added to the voltage VC, and a read voltage based on the new shift amount is a voltage VD (S68 of FIG. 19). At the read voltage VD, the number of ON-cells "chist(shift)" is larger than the expected value "chist$_{exp}$", and thus the variable "sign" is −1. Since the variable "sign$_{pre}$" (that is, the variable "sign" corresponding to the read voltage VC) is 1 and the variable "sign" is −1 (S74 of FIG. 20, Yes), the size of the differential shift amount is determined (S75 of FIG. 20). Since the voltage S as the differential shift amount is larger than the threshold TH (S75 of FIG. 20, No), the differential shift amount is divided by 2 (S76 of FIG. 20). The differential shift amount is now S/2, and the read voltage based on the new shift amount is determined again.

The voltage S/2 is subtracted from the voltage VD, and a read voltage based on the new shift amount is a voltage VE (S68 of FIG. 19). At the read voltage VE, the number of ON-cells "chist(shift)" is larger than the expected value "chist$_{exp}$", and thus the variable "sign" is −1. Since both of the variables "sign$_{pre}$" (that is, the variable "sign" corresponding to the read voltage VD) and "sign" are −1 (S74 of FIG. 20, No), the read voltage based on the new shift amount is determined again.

The voltage S/2 is subtracted from the voltage VE, and a read voltage based on the new shift amount is a voltage VF (S68 of FIG. 19). At the read voltage VF, the number of ON-cells "chist(shift)" is smaller than the expected value "chist$_{exp}$", and thus the variable "sign" is 1. Since the variable "sign$_{pre}$" (that is, the variable "sign" corresponding to the read voltage VE) is −1 and the variable "sign" is 1 (S74 of FIG. 20, Yes), the size of the differential shift amount is determined again (S75 of FIG. 20). Since the voltage S/2 as the differential shift amount is larger than the threshold TH (S75 of FIG. 20, No), the differential shift amount is divided by 2 (S76 of FIG. 20). The differential shift amount is now S/4, and the read voltage based on the new shift amount is determined again.

The voltage S/4 is added to the voltage VF, and a read voltage based on the new shift amount is a voltage VG (S68 of FIG. 19). At the read voltage VG, the number of ON-cells "chist(shift)" is smaller than the expected value "chist$_{exp}$", and thus the variable "sign" is 1. Since both of the variables "sign$_{pre}$" (that is, the variable "sign" corresponding to the read voltage VF) and "sign" are 1 (S74 of FIG. 20, No), the read voltage based on the new shift amount is determined again.

The voltage S/4 is added to the voltage VG, and a read voltage based on the new shift amount is a voltage VH (S68 of FIG. 19). At the read voltage VH, the number of ON-cells "chist(shift)" is larger than the expected value "chist$_{exp}$", and thus the variable "sign" is −1. Since the variable "sign$_{pre}$" (that is, the variable "sign" corresponding to the read voltage VG) is 1 and the variable "sign" is −1 (S74 of FIG. 20, Yes), the size of the differential shift amount is determined again (S75 of FIG. 20). Since the voltage S/4 as the differential shift amount is smaller than the threshold TH (S75 of FIG. 20, Yes), the suitable shift amount is determined (S77 of FIG. 20). That is, the suitable shift amount "shift$_{opt}$" is calculated using the read voltage VG and the read voltage VH.

In this way, the memory system according to the second embodiment calculates the suitable shift amount "shift$_{opt}$" by increasing or decreasing the shift amount while decreasing the additional shift amount "val".

<2-3> Effect

In the memory system according to the second embodiment described above, the operating speed can be improved.

The memory system according to the second embodiment determines a read voltage at the starting point based on the shift amount information 21 in the tracking process, and reads a plurality of pieces of data while decreasing the shift amount from the starting point, and determines the suitable shift amount. The memory system according to the second embodiment can rapidly search for the suitable shift amount by narrowing the search step from a large shift amount to a small shift amount. As a result, the memory system according to the second embodiment can improve the operating speed.

<3> Modification Examples

When the search range is inappropriate, the memory system according to the first embodiment changes the initial value of the shift amount (S30 and S32 of FIG. 10), and searches for the suitable shift amount in a new search range (S21 and thereafter of FIG. 9). However, when the search range is inappropriate, the memory system may calculate the shift amount and end the process. Specifically, instead of the processes of Step S30 and thereafter described with reference to FIG. 10, the memory system may calculate a shift amount "shift(SP)" as "shift$_{opt}$" and end the process. In addition, instead of the processes of Step S32 and thereafter described with reference to FIG. 10, the memory system may calculate a shift amount "shift(1)" as "shift$_{opt}$" and end the process.

In the embodiment described above, the division is executed. The memory system may round up or round down the result of the division.

In the embodiment described above, the two examples of the tracking process (S11 of FIG. 8) are described. However, the tracking process is not limited to the examples described in the embodiment described above, and various modifications can be made. For example, hereinafter, a first estimation method will be described.

(First Estimation Method)

In the first estimation method, the memory controller 30 causes the nonvolatile memory 10 to execute a plurality of data read processes while shifting the read voltage. The arithmetic circuit 37 calculates, as a histogram H1, the number of memory cell transistors MT in each of threshold voltage ranges, which are divided by a plurality of read voltages, based on a plurality of pieces of read data acquired by the plurality of data read processes. The number of memory cell transistors MT in each of threshold voltage ranges is referred to as the number of interval cells.

The control circuit 31 determines the plurality of read voltages R1 to R7 based on the calculated histogram H1. The control circuit 31 calculates a plurality of shift amounts ΔR1 to ΔR7 based on the determined plurality of read voltages R1 to R7. A method of determining the plurality of read voltages R1 to R7 based on the histogram H1 will be described using FIGS. 23A to 23C.

Figure 23A:
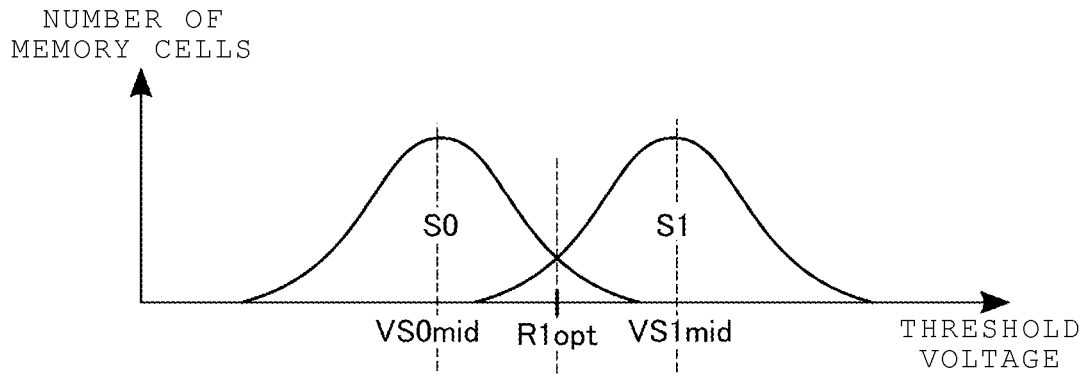
FIGS. 23A to 23C are diagrams illustrating an example of a first estimation method that is applied to a shift amount estimation process in a memory system according to a modification example.
Figure 23B:
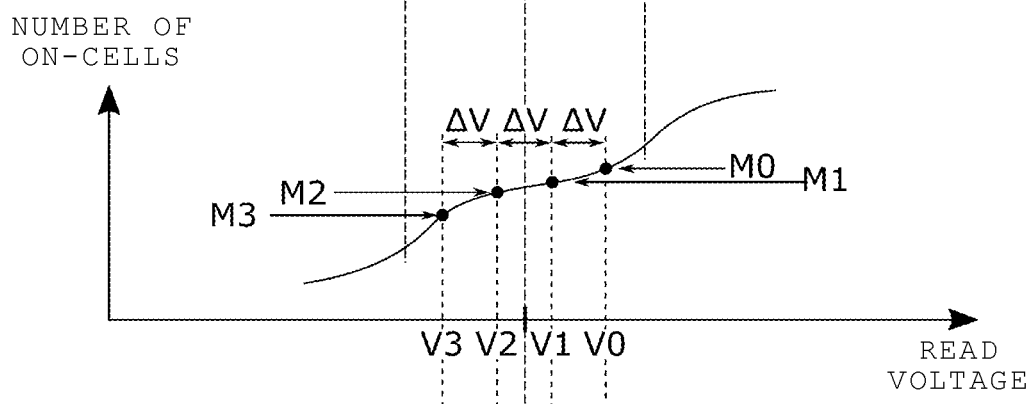
Figure 23C:
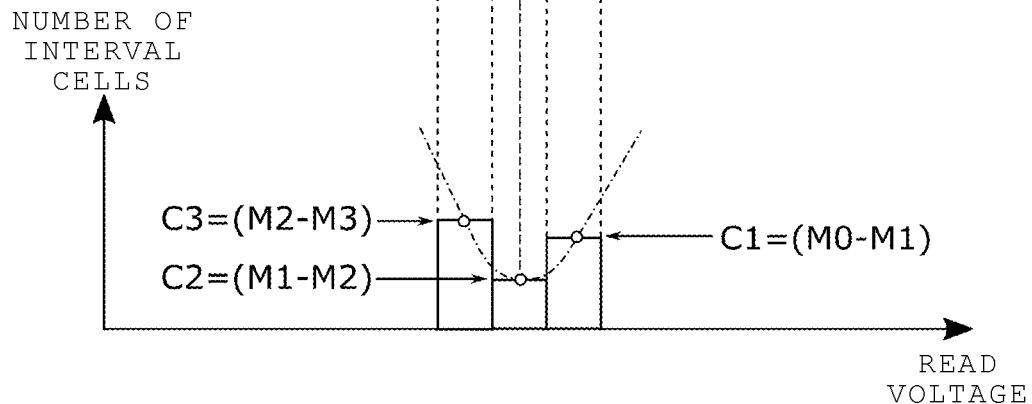

FIGS. 23A to 23C are diagrams illustrating an example of the first estimation method that is applied to a shift amount estimation process in the memory system according to the modification example.

FIG. 23A illustrates, for example, two threshold voltage distributions corresponding to the "S0" state and the "S1" state. FIG. 23B illustrates the transition of the number of ON-cells M. FIG. 23C illustrates the transition of the amount of change in the number of ON-cells between two read voltages, that is, the number of interval cells C. FIG. 23C corresponds to the histogram H1 described above.

As illustrated in FIG. 23B, as the read voltage V is shifted from a higher voltage side to a lower voltage side, the number of ON-cells M rapidly decreases at a voltage that is slightly higher than a voltage VS1mid, which is a mode of the "S1" state, and |dM/dV| is the maximum. Here, the mode is a voltage at which the distribution probability of the threshold voltage in FIG. 23A is the maximum. Further, as the read voltage V decreases, the decrease rate of the number of ON-cells M decreases, and the decrease rate of the number of ON-cells M at a certain value of the read voltage V is the minimum. When the threshold voltage distribution belonging to the "S1" state and the threshold voltage distribution belonging to the "S0" state do not overlap each other, the minimum value of the decrease rate of the number of ON-cells M is zero. On the other hand, when the threshold voltage distribution belonging to the "S1" state and the threshold voltage distribution belonging to the "S0" state overlap each other, the minimum value of the decrease rate of the number of ON-cells M is a value (>0) other than zero. As the read voltage V further decreases, the decrease rate of the number of ON-cells M further increases, and |dM/dV| is the maximum again at a voltage that is slightly higher than a voltage VS0mid, which is a mode of the "S0" state.

A read voltage V at which the overlapping of the threshold voltage distributions between two states is the minimum (that is, the read voltage V corresponding to an intersection between the threshold voltage distributions of the two states) can be detected by the change in the number of ON-cells M described above. For example, first, the memory system according to the modification example executes a data read process using a read voltage V0. At this time, the number of ON-cells is M0. Next, the memory system executes a data read process using a voltage V1 that is lower than the voltage V0 by ΔV. At this time, the number of ON-cells is M1. As a result, when the read voltage is decreased from V0 to V1, the number of memory cell transistors MT that newly enter an OFF state is C1=M0−M1. That is, the number of interval cells in a threshold voltage range [V0,V1] is C1.

Next, the memory system executes a data read process using a voltage V2 that is lower than the voltage V1 by ΔV. At this time, the number of ON-cells is M2. As a result, when the read voltage is decreased from V1 to V2, the number of memory cell transistors MT that newly enter an OFF state is C2=M1−M2. That is, the number of interval cells in a threshold voltage range [V1,V2] is C2. Assuming that C1>C2, it is considered that a voltage at which |dM/dV| is the minimum is positioned at least on a lower voltage side than the voltage V1.

Next, the memory system executes a data read process using a voltage V3 that is lower than the voltage V2 by ΔV. At this time, the number of ON-cells is M3. As a result, when the read voltage is decreased from V2 to V3, the number of memory cell transistors MT that newly enter an OFF state is C3=M2−M3. That is, the number of interval cells in a threshold voltage range [V2,V3] is C3. Here, assuming that C3>C2, the histogram shown in FIG. 23C is acquired as the histogram H1.

As a result, the threshold voltage distribution indicated by a chain line in FIG. 23C can be estimated based on the numbers of interval cells C. It can be estimated that a read voltage at which the overlapping of the threshold voltage distribution belonging to the "S1" state and the threshold voltage distribution belonging to the "S0" state is the minimum is present between the voltage V1 and the voltage V2 (in the interval where the number of interval cells is the minimum value).

Through the operation described above, in the first estimation method, the read voltage is determined based on the plurality of data read processes.

When data stored in each of the memory cell transistors MT is associated with non-continuous voltage ranges, a data read process of one page data (also referred to as page read process) may include data read processes using a plurality of read voltages. Specifically, for example, as described above with reference to FIG. 4, data of "1" of the lower bit is associated with a voltage range of the read voltage R1 or lower (that is the "S0" state) and a voltage range of the read voltage R5 or higher (that is, the "S5" to "S7" states). Therefore, only with read data acquired by the lower page read process (that is, read data acquired by using the voltages R1 and R5 as the read voltage, respectively), which may be executed while shifting the read voltage, it may be difficult to appropriately calculate the number of ON-cells.

Accordingly, when a page read process includes data read processes using a plurality of read voltages, the memory controller 30 causes the nonvolatile memory 10 to further execute at least one single state read process in addition to the plurality of data read processes. The single state read process in which read data is generated based on one read voltage is different from the page read process in which read data is generated based on two or more read voltages. A voltage that is positioned between non-continuous voltage ranges that are not are associated with data stored in each of the memory cell transistors MT is applied to the single state read process. Specifically, a single state read process using the read voltage R3 may be executed, for example, on the lower page read process. A single state read process using the read voltage R3 and a single state read process using the read voltage R5 may be executed on the middle page read process. A single state read process using the read voltage R5 may be executed on the upper page read process.

For example, in the single state read process using the read voltage R3 for the lower page read process, it is assumed that the memory cell transistors MT in the "S0" to "S2" states store data of "1" as the lower bit, and the memory cell transistors MT in the "S3" to "S7" states store data of "0" as the lower bit. In this case, the number of data of "1" in data obtained by an AND operation of two pieces of page data, one of which is acquired by the data read process using the read voltage R3 and the other of which is acquired by the data read process using the read voltage R1, represents the number of memory cell transistors MT in the "S1" state in the cell unit CU. Likewise, the number of data of "1" in data obtained by an OR operation of two pieces of page data, one of which is acquired by a logical-inversion of page data acquired by the read process using the read voltage R3 and the other of which is acquired by the read process using the read voltage R5, represents the number of memory cell transistors MT in the "S0" to "S4" states in the cell unit CU. As a result, the memory controller 30 can appropriately calculate the number of ON-cells.

In the embodiment described above, the case where the tracking process is executed to estimate the suitable shift amount in the patrol process is described. In the patrol process, the suitable shift amount may be estimated using a method other than the tracking process. As an example of the method other than the tracking process, a second estimation method will be described below. In the patrol process, the memory system may execute a process based on the second estimation method in addition to the tracking process or instead of the tracking process.

(Second Estimation Method)

In the second estimation method, the arithmetic circuit 37 calculates, as a histogram H2, the number of memory cell transistors MT belonging to each of the "S0" state to the "S7" state in read data before the error correction process, based on the lower page data, the middle page data, and the upper page data each before the error correction process. In addition, the arithmetic circuit 37 calculates, as a histogram H3, the number of memory cell transistors MT belonging to each of the "S0" state to the "S7" state in read data after the error correction process, based on the lower page data, the middle page data, and the upper page data each after the error correction process. The arithmetic circuit 37 calculates the numbers of memory cells E_x(x+1) and E_y(y−1) based on the calculated histogram H2 and the calculated histogram H3 (0≤x≤6, 1≤y≤7). The number of memory cells E_x(x+1) is the number of memory cells from which data written as an "S(x+1)" state is erroneously read as an "Sx" state. The number of memory cells E_y(y−1) is the number of memory cells from which data written as an "S(y−1)" state is erroneously read as an "Sy" state.

The control circuit 31 calculates the plurality of shift amounts ΔR1 to ΔR7 based on the numbers of memory cells E_x(x+1) and E_y(y−1) described above. The method of calculating the plurality of shift amounts ΔR1 to ΔR7 based on the numbers of memory cells E_x(x+1) and E_y(y−1) will be described using FIGS. 24A to 24C.

Figure 24A:
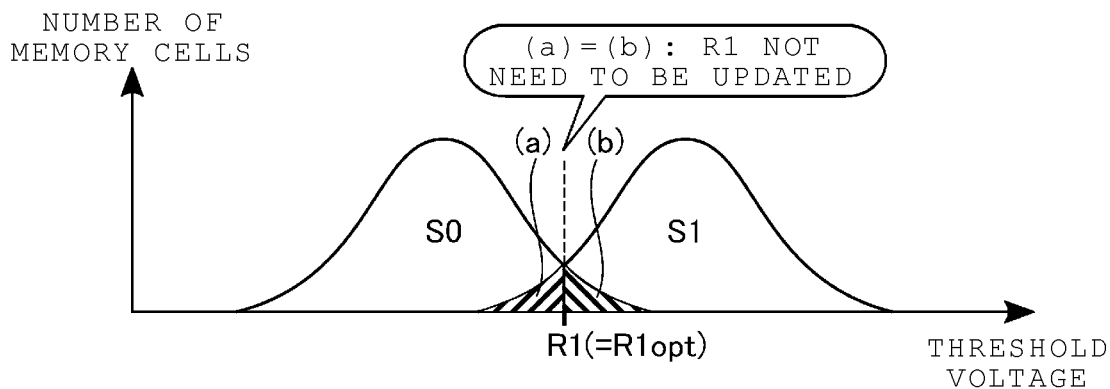
FIGS. 24A to 24C are diagrams illustrating an example of a second estimation method that is applied to a shift amount estimation process in the memory system according to the modification example.
Figure 24B:
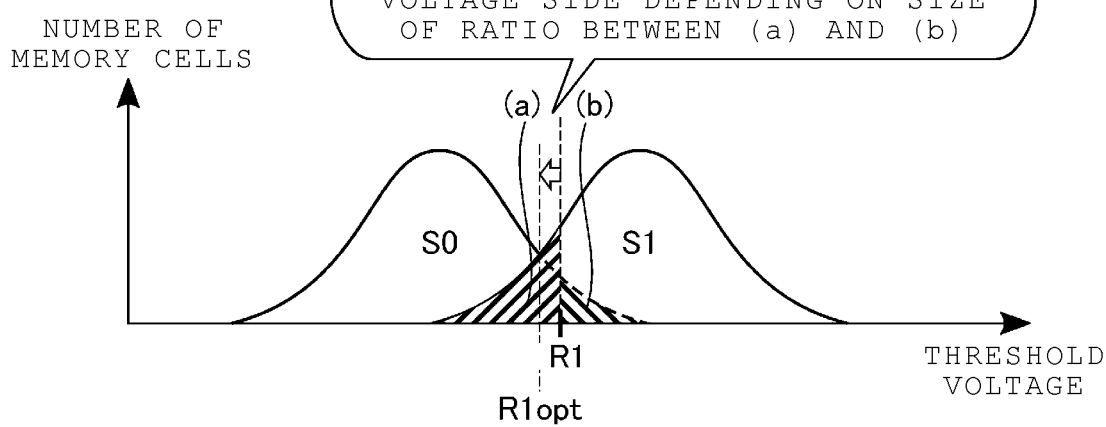
Figure 24C:
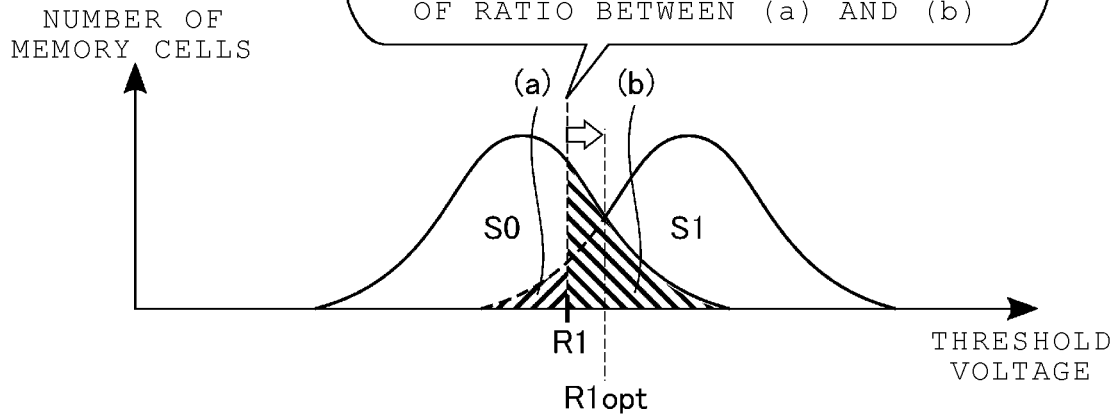

FIGS. 24A to 24C are diagrams illustrating an example of the second estimation method that is applied to the shift amount estimation process in the memory system according to the modification example. FIGS. 24A to 24C illustrate a case where the shift amount ΔR1 of the read voltage R1 is calculated. The number of memory cells E_01, from which data written as the "S1" state is erroneously read as the "S0" state, corresponds to the area of a region (a) in FIGS. 24A to 24C. In addition, the number of memory cells E_10, from which data written as the "S0" state is erroneously read as the "S1" state, corresponds to the area of a region (b) in FIGS. 24A to 24C.

FIG. 24A illustrates a case where the read voltage R1 and a voltage R1opt, which is at a position where the two threshold voltage distributions corresponding to the "S0" state and the "S1" state intersect with each other, are the same as each other. In the example illustrated in FIG. 24A, the area of the region (a) and the area of the region (b) are the same as each other. In this case, it is expected that the number of fail bits E (=E_01+E_10) included between the "S0" state and the "S1" state is the minimum. Therefore, the memory controller 30 determines that it is not necessary to update the read voltage R1. That is, the memory controller 30 determines the shift amount ΔR1 of "0" (ΔR1=0).

FIG. 24B illustrates a case where the read voltage R1 is positioned on a higher voltage side than the voltage R1opt. In the example illustrated in FIG. 24B, the area of the region (a) is larger than the area of the region (b). In this case, the number of fail bits E is larger than the number of fail bits E in FIG. 24A, which is not preferable. Therefore, the memory controller 30 shifts the read voltage R1 to a lower voltage side to approach the voltage R1opt. That is, the memory controller 30 determines a negative value of the shift amount ΔR1 (ΔR1<0).

FIG. 24C illustrates a case where the read voltage R1 is positioned on a lower voltage side than the voltage R1opt. In the example illustrated in FIG. 24C, the area of the region (a) is smaller than the area of the region (b). In this case, the number of fail bits E is larger than the number of fail bits E in FIG. 24A, which is not preferable. Therefore, the memory controller 30 shifts the read voltage R1 to a higher voltage side to approach the voltage R1opt. That is, the memory controller 30 determines a positive value of the shift amount ΔR1 (ΔR1>0).

It is expected that an absolute value of a difference between the area of the region (a) and the area of the region (b) increases as the read voltage R1 becomes away from the voltage R1opt. Therefore, the memory controller 30 determines the shift amount ΔR1 of the read voltage R1 depending on the size of a ratio between the area of the region (a) and the area of the region (b) (that is, the size of a ratio between the number of memory cells E_10 and the number of memory cells E_01). As a result, an appropriate shift amount can be determined depending on the degree of the overlapping of the threshold voltage distributions, and the shift amount ΔR1 can be calculated to approach the voltage R1opt.

Although not illustrated in the drawing, for the other read voltages R2 to R7, the shift amounts ΔR2 to ΔR7 may be calculated as in the read voltage R1.

Through the operation described above, in the second estimation method, the plurality of shift amounts ΔR1 to ΔR7 are calculated based on the lower page data, the middle page data, and the upper page data each before the error correction process, and the lower page data, the middle page data, and the upper page data each after the error correction process.

A relationship between a shift amount ΔR1pre before the estimation and a shift amount ΔR1post after the estimation is as follows. That is, as illustrated in FIG. 24A, when the area of the region (a) and the area of the region (b) are the same as each other, it is not necessary to update the shift amount ΔR1pre. Therefore, ΔR1post=ΔR1pre. As illustrated in FIG. 24B, when the area of the region (a) is larger than the area of the region (b), the shift amount ΔR1post is updated to a value lower than the shift amount ΔR1pre. As illustrated in FIG. 24C, when the area of the region (a) is smaller than the area of the region (b), the shift amount ΔR1post is updated to a value higher than the shift amount ΔR1pre.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
   a nonvolatile memory including a plurality of memory cells; and
   a memory controller configured to execute a data read process of reading data from the plurality of memory cells,
   wherein the memory controller is further configured to:
   execute a first tracking process to determine a value of a first voltage in a patrol process that is carried out independently of a request from a host;
   execute a first data read process to read first data from the nonvolatile memory in response to receiving a read request from the host;
   cause the nonvolatile memory to execute a second tracking process using the first voltage when error correction of the first data fails;
   receive a value of a second voltage from the nonvolatile memory as a result of the second tracking process; and
   execute a second data read process using the second voltage to read second data from the nonvolatile memory.

2. The memory system according to claim 1, wherein in the patrol process, the memory controller:
   executes the first tracking process using a third voltage to determine a value of a fourth voltage;
   executes a third data read process using the fourth voltage to read third data from the nonvolatile memory; and
   determines the value of the fourth voltage as the value of the first voltage when error correction of the third data is successful.

3. The memory system according to claim 2, wherein during the first tracking process, the memory controller:
   determines a search range based on a value of the third voltage;
   executes a plurality of data read processes while shifting a read voltage in the search range by a predetermined shift amount; and
   determines, as the fourth voltage, a read voltage at which the number of memory cells in an ON state among the plurality of memory cells satisfies a first condition.

4. The memory system according to claim 2, wherein during the first tracking process, the memory controller:
   executes a plurality of data read processes using a plurality of read voltages, respectively;
   counts the number of memory cells in an ON state among the plurality of memory cells in each of the plurality of data read processes; and
   determines the value of the fourth voltage from (A) a value of a fifth voltage that is a maximum read voltage among read voltages at which the number of the memory cells in the ON state is smaller than an expected value and (B) a value of a sixth voltage that is a minimum read voltage among read voltages at which the number of the memory cells in the ON state is larger than the expected value.

5. The memory system according to claim 4, wherein the memory controller is configured to:
   calculate a difference, as a first difference, between the expected value and a first number that is the number of the memory cells in the ON state in a data read process using the fifth voltage;
   calculate a difference, as a second difference, between the first number and a second number that is the number of the memory cells in the ON state in a data read process using the sixth voltage;

calculate a difference, as a third difference, between the value of the fifth voltage and the value of the sixth voltage;

multiply a ratio between the first difference and the second difference by the third difference; and add a result of the multiplication to the value of the fifth voltage to determine the value of the fourth voltage.

6. The memory system according to claim 2, wherein during the first tracking process, the memory controller:

executes a plurality of data read processes using a plurality of read voltages, respectively;

when the number of memory cells in an ON state among the plurality of memory cells is smaller than an expected value in a fourth data read process among the plurality of data read processes, increases a read voltage and executes a fifth data read process among the plurality of data read processes; and when the number of the memory cells in the ON state is larger than the expected value in a sixth data read process among the plurality of data read processes, decreases a read voltage and executes a seventh data read process among the plurality of data read processes.

7. The memory system according to claim 6, wherein the fourth data read process is executed using a seventh voltage, the sixth data read process is executed using an eighth voltage, and the memory controller determines the value of the fourth voltage based on a value of a first voltage difference that is a difference between a value of the seventh voltage and a value of the eighth voltage.

8. The memory system according to claim 7, wherein when the value of the first voltage difference is larger than a threshold, the memory controller subtracts a value of a second voltage difference smaller than the value of the first voltage difference from the value of the seventh voltage or adds the value of the second voltage difference to the value of the eighth voltage to determine the value of the fourth voltage.

9. The memory system according to claim 1, wherein in the patrol process, the memory controller:

executes an eighth data read process using a ninth voltage to read fourth data from the nonvolatile memory;

executes an error correction process on the fourth data to acquire fifth data; and determines the value of the first voltage from a value of the ninth voltage based on a difference between the number of bits having a first value in the fourth data and the number of bits having a second value in the fifth data.

10. The memory system according to claim 1, wherein during the second tracking process, the nonvolatile memory:

determines a read voltage based on the first voltage;

executes a plurality of data read processes while shifting the read voltage; and estimates the value of the second voltage based on the plurality of data read processes.

11. A method of controlling a nonvolatile memory, the nonvolatile memory including a plurality of memory cells, said method comprising:

executing a first tracking process to determine a value of a first voltage in a patrol process that is carried out independently of a request from a host;

executing a first data read process that is responsive to a read request from the host to read first data from the nonvolatile memory;

determining that error correction of the first data fails;

in response to determining that the error correction of the first data fails, causing the nonvolatile memory to execute a second tracking process using the first voltage;

receiving a value of a second voltage from the nonvolatile memory as a result of the second tracking process; and executing a second data read process using the second voltage to read second data from the nonvolatile memory.

12. The method according to claim 11, wherein the patrol process includes the steps of:

executing the first tracking process using a third voltage to determine a value of a fourth voltage;

executing a third data read process using the fourth voltage to read third data from the nonvolatile memory;

determining that error correction of the third data is successful; and in response to determining that the error correction of the third data is successful, determining the value of the fourth voltage as the value of the first voltage.

13. The method according to claim 12, wherein the first tracking process includes the steps of:

determining a search range based on a value of the third voltage;

executing a plurality of data read processes while shifting a read voltage in the search range by a predetermined shift amount; and determining, as the fourth voltage, a read voltage at which the number of memory cells in an ON state among the plurality of memory cells satisfies a first condition.

14. The method according to claim 12, wherein the first tracking process includes the steps of:

executing a plurality of data read processes using a plurality of read voltages, respectively;

counting the number of memory cells in an ON state among the plurality of memory cells in each of the plurality of data read processes; and determining the value of the fourth voltage from (A) a value of a fifth voltage that is a maximum read voltage among read voltages at which the number of the memory cells in the ON state is smaller than an expected value and (B) a value of a sixth voltage that is a minimum read voltage among read voltages at which the number of the memory cells in the ON state is larger than the expected value.

15. The method according to claim 14, further comprising:

calculating a difference, as a first difference, between the expected value and a first number that is the number of the memory cells in the ON state in a data read process using the fifth voltage;

calculating a difference, as a second difference, between the first number and a second number that is the number of the memory cells in the ON state in a data read process using the sixth voltage;

calculating a difference, as a third difference, between the value of the fifth voltage and the value of the sixth voltage;

multiplying a ratio between the first difference and the second difference by the third difference; and adding a result of the multiplication to the value of the fifth voltage to determine the value of the fourth voltage.

16. The method according to claim 12, wherein the first tracking process includes the steps of:

executing a plurality of data read processes using a plurality of read voltages, respectively;

determining that the number of memory cells in an ON state among the plurality of memory cells is smaller than an expected value in a fourth data read process among the plurality of data read processes;

in response to determining that the number of the memory cells in the ON state among the plurality of memory cells is smaller than the expected value in the fourth data read process, increasing a read voltage and executing a fifth data read process among the plurality of data read processes;

determining that the number of the memory cells in the ON state is larger than the expected value in a sixth data read process among the plurality of data read processes;

in response to determining that the number of the memory cells in the ON state is larger than the expected value in the sixth data read process, decreasing a read voltage and executing a seventh data read process among the plurality of data read processes.

17. The method according to claim 16, wherein the fourth data read process is executed using a seventh voltage, the sixth data read process is executed using an eighth voltage, and the value of the fourth voltage is determined based on a value of a first voltage difference that is a difference between a value of the seventh voltage and a value of the eighth voltage.

18. The method according to claim 17, further comprising:

determining that the value of the first voltage difference is larger than a threshold; and in response to determining that the value of the first voltage difference is larger than the threshold, subtracting a value of a second voltage difference smaller than the value of the first voltage difference from the value of the seventh voltage or adding the value of the second voltage difference to the value of the eighth voltage to determine the value of the fourth voltage.

19. The method according to claim 11, wherein the patrol process includes the steps of:

executing an eighth data read process using a ninth voltage to read fourth data from the nonvolatile memory;

executing an error correction process on the fourth data to acquire fifth data; and determining the value of the first voltage from a value of the ninth voltage based on a difference between the number of bits having a first value in the fourth data and the number of bits having a second value in the fifth data.

20. The method according to claim 11, wherein the second tracking process executed by the nonvolatile memory includes the steps of:

determining a read voltage based on the first voltage;

executing a plurality of data read processes while shifting the read voltage; and estimating the value of the second voltage based on the plurality of data read processes.

* * * * *